United States Patent
Sugimoto et al.

(10) Patent No.: US 9,699,254 B2
(45) Date of Patent: Jul. 4, 2017

(54) COMPUTER SYSTEM, CACHE MANAGEMENT METHOD, AND COMPUTER

(71) Applicant: Hitachi, Ltd., Tokyo (JP)

(72) Inventors: Ken Sugimoto, Tokyo (JP); Yuusuke Fukumura, Tokyo (JP); Nobukazu Kondo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 14/507,151

(22) Filed: Oct. 6, 2014

(65) Prior Publication Data

US 2015/0100663 A1    Apr. 9, 2015

(30) Foreign Application Priority Data

Oct. 7, 2013   (JP) ................................ 2013-210087

(51) Int. Cl.
  *G06F 15/167* (2006.01)
  *H04L 29/08* (2006.01)

(52) U.S. Cl.
  CPC ...... *H04L 67/1097* (2013.01); *H04L 67/2852* (2013.01)

(58) Field of Classification Search
  CPC ........... H04L 29/08729; H04L 49/9042; H04L 49/9063; H04L 67/2842
  USPC ......................... 709/213, 229, 224, 223, 200
  See application file for complete search history.

(56) References Cited

U.S. PATENT DOCUMENTS

| | | | | |
|---|---|---|---|---|
| 6,490,659 B1* | 12/2002 | McKean | ............. | G06F 11/1441 711/113 |
| 6,681,303 B1* | 1/2004 | Watanabe | ........... | G06F 11/1451 711/162 |
| 6,957,294 B1* | 10/2005 | Saunders | ............ | G06F 12/0866 709/220 |
| 9,317,381 B2* | 4/2016 | Suzuki | ................... | G06F 11/203 |
| 2004/0015730 A1* | 1/2004 | Arai | ........................ | H04L 63/10 726/29 |
| 2005/0210212 A1* | 9/2005 | Nagasoe | ............... | G06F 3/0614 711/163 |
| 2006/0187780 A1 | 8/2006 | Takeda | | |
| 2008/0120394 A1* | 5/2008 | Yokoyama | .............. | H04L 67/02 709/217 |

(Continued)

FOREIGN PATENT DOCUMENTS

JP     2006-236470 A    9/2006

*Primary Examiner* — El Hadji Sall
(74) *Attorney, Agent, or Firm* — Foley & Lardner LLP

(57) ABSTRACT

A computer system comprising: a server on which an application operates; and a storage system that stores data used by the application, the server including an operating system for controlling the server, the operating system including a cache driver for controlling a cache, the cache driver storing access management information for managing the number of accesses to a partial storage area of a volume provided by the storage system, and the cache driver being configured to: manage the number of accesses to the partial storage area of the volume by using the first access management information; replace the storage area to which the number of accesses is to be managed based on a predetermined replacement algorithm; and control arrangement of data in the server cache based on the first access management information.

15 Claims, 23 Drawing Sheets

(56) References Cited

U.S. PATENT DOCUMENTS

2015/0242289 A1* 8/2015 Suzuki .............. G06F 11/1662
714/4.11

* cited by examiner

CACHE CORRESPONDENCE TABLE

| 2451<br>CACHE<br>MEMORY<br>ADDRESS | 2452<br>SHARED<br>STORAGE<br>ADDRESS | 2453<br>ENTRY<br>VALID<br>BIT | 2454<br>CACHE<br>VALID<br>BIT | 2455<br>READ<br>COUNT | 2456<br>WRITE<br>COUNT | 2457<br>NEXT<br>ENTRY<br>POINTER | 2458<br>PREVIOUS<br>ENTRY<br>POINTER |
|---|---|---|---|---|---|---|---|
| 0x000000 | 0x10000000 | 1 | 1 | 13 | 20 | 0x0120 | 0x0100 |
| 0x020000 | 0x10002000 | 1 | 1 | 4 | 3 | 0x0124 | 0x0120 |
| 0x230000 | 0x10008000 | 1 | 1 | 2 | 0 | 0x0128 | 0x0124 |
| ⋮ | | | | | | | |
| 0x400000 | 0x20000000 | 1 | 1 | 15 | 35 | 0x0200 | 0x0220 |
| 0x402000 | 0x10004000 | 1 | 1 | 80 | 0 | 0x0230 | 0x0200 |
| 0x404000 | 0x10006000 | 1 | 1 | 46 | 3 | 0x0220 | 0x0130 |
| ⋮ | | | | | | | |
| — | 0x20004000 | 0 | 0 | 6 | 3 | 0x0224 | 0x0124 |
| — | 0x10010000 | 0 | 0 | 1 | 0 | 0x0134 | 0x0150 |
| ⋮ | | | | | | | |

2450

COMPUTER SYSTEM, CACHE MANAGEMENT METHOD, AND COMPUTER

CLAIM OF PRIORITY

The present application claims priority from Japanese patent application JP 2013-210087 filed on Oct. 7, 2013, the content of which is hereby incorporated by reference into this application.

BACKGROUND OF THE INVENTION

The present invention relates to cache control in I/O operations which use cache areas of servers and storage systems.

In recent years, flash memories capable of operating at a higher speed than HDDs have been mounted on servers, and in the future, it is expected that high-speed memories such as magnetoresistive random access memories (MRAM) and phase change memories (PCMs) will be also mounted on servers.

One of methods of utilizing such high-speed memories mounted on servers is utilizing high-speed memories as caches of a storage system. Specifically, caches for data to be stored in a storage system are arranged in a high-speed memory mounted on a server. In this way, the number of I/O operations to the storage system is decreased, and eventually, the I/O operations in the storage system are accelerated.

Examples of a cache control method in high-speed memories include a control method which uses a first-in-first-out (FIFO) algorithm and a control method which uses a least recently used (LRU) algorithm.

A "Hot data pinning method" can be considered as an example of such a cache control method. In the "Hot data pinning method," the number of I/O operations (that is, the number of accesses) to a storage system from a server is obtained for respective blocks of the storage system, and the data of a block of the storage system, to which the number of accesses is large is arranged in a high-speed memory every predetermined period of time.

For example, when the number of accesses to each block of a storage system from a server is obtained for a certain period of time, and the results show that the number of accesses to an address A is 100, the number of accesses to an address B is 15, and the number of accesses to an address C is 50, items of data are arranged in the high-speed memory in the order of the addresses A, C, and B. After that, the numbers of accesses to each block of the storage system from the server is obtained again, and arrangement of data in the high-speed memory is replaced based on the number of accesses to each block.

As an example of the Hot data pinning method, Japanese Unexamined Patent Application Publication No. 2006-236470 discloses a method of storing an access history in respective blocks.

SUMMARY OF THE INVENTION

However, the "Hot data pinning method" has a problem in that a storage area for storing the number of accesses to each block of the storage system is not sufficient. This is because it is necessary to store the number of accesses to each block of the storage system in a main memory mounted on a server such as a DRAM.

For example, when a storage capacity of a storage system is 1 PB, the number of accesses is obtained in respective 8 KB blocks, and the storage capacity required for managing the number of accesses per block is 32 bits, the required capacity of the main memory of the server is 4 TB as indicated by Mathematical Formula (1) below, Mathematical Formula (1)

$$\frac{1 \text{ PB}}{8 \text{ KB} \times 32 \text{ bit}} = 4 \text{ TB} \qquad (1)$$

In general, since the capacity of a main memory (DRAM) mounted on one server is several hundreds of GB to several TB, it is not reasonable to consume 4 TB of the main memory by employing the Hot data pinning method. Even when the storage capacity of the storage system is 100 TB, the required capacity of the main memory mounted on the server is 400 GB. Thus, the Hot data pinning method consumes a large amount of the main memory capacity.

Moreover, when information on the number of accesses is stored in a high-speed memory such as a flash memory, since an I/O operation for obtaining the number of accesses occurs, it is not possible to reduce the number of I/O operations which is an original object to arrange caches of a storage system in a server.

The present invention can be appreciated by the description which follows in conjunction with the following figures, wherein: a computer system comprising: a server on which a predetermined application operates; and a storage system that stores data used by the application. The server includes a first processor, a first memory, a cache device on which a server cache that stores data temporarily is set, and a first interface for coupling to other devices. The storage system includes a controller and a plurality of storage apparatuses. The controller includes a second processor, a second memory, and a second interface for coupling to another apparatus. The server includes an operating system for controlling the server, and the storage system includes a storage control part for controlling the storage system. The operating system includes a cache driver for controlling the server cache. The cache driver stores first access management information for managing the number of accesses to a partial storage area of a volume provided by the storage system. The cache driver is configured to: manage the number of accesses to the partial storage area of the volume by using the first access management information; replace the storage area to which the number of accesses is to be managed based on a predetermined replacement algorithm; and control arrangement of data in the server cache based on the first access management information.

According to the present invention, the server manages the number of accesses to only a partial storage area of the volumes provided by the storage system. Thus, it is possible to reduce the memory capacity of the server for managing the number of accesses.

The problems, structures and effects other than those described above are made clear by the following explanation of the embodiment.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, embodiments of the present invention will be described in detail based on the drawings.

In the present invention, a server is configured to manage the number of accesses in respective block units with respect to a partial storage area of all storage areas of a storage system. In this case, the server needs to determine a predetermined unit of storage areas (blocks) in which the number of accesses is to be managed among all storage areas of the storage system so that the cache efficiency is optimized.

Thus, in the present invention, a storage area to which the number of accesses is to be obtained is selected among all storage areas provided by the storage system. The server obtains a detailed number of accesses in predetermined units with respect to the selected storage area.

First Embodiment

In a first embodiment, access management information (access counter) for managing the number of accesses between a server module 110 (see FIG. 1) and a shared storage system 130 (see FIG. 1) is hierarchized.

The server module 110 (see FIG. 1) has access management information (access counter) for managing the number of accesses in respective block units. In the access management information (access counter) of the server module 110, the number of accesses to a partial storage area of the shared storage system 130 is managed.

On the other hand, the shared storage system 130 (see FIG. 1) has access management information (access counter) for managing the number of block group-based accesses. Here, a block group indicates a storage area made up of a plurality of blocks. In the access management information (access counter) of the shared storage system 130 (see FIG. 1), the number of accesses to all storage areas of the shared storage system 130 (see FIG. 1) is managed.

Figure 1:
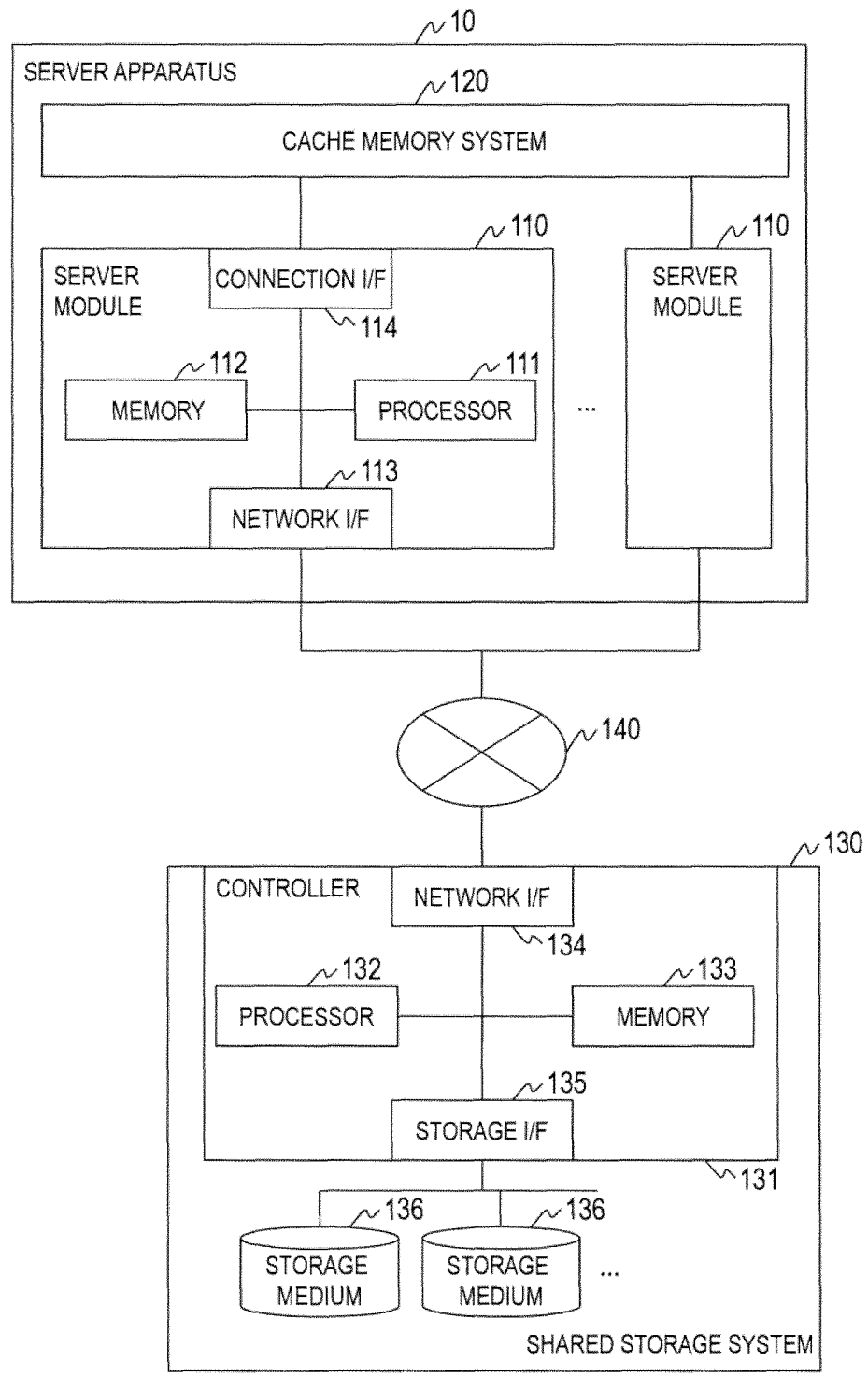
FIG. 1 is a block diagram illustrating an example of a hardware configuration of a computer system according to a first embodiment.

A cache driver 210 (see FIG. 2) of the server module 110 determines a block group in which the number of accesses is to be managed in respective block units based on the numbers of accesses in respective block group units of all storage areas of the shared storage system 130 (see FIG. 1). Moreover, the cache driver 210 (see FIG. 2) of the server module 110 manages the number of accesses to each of the blocks that form the determined block group.

In this way, it is possible to reduce the storage capacity of a server-side main memory required for storing the number of accesses.

Figure 2:
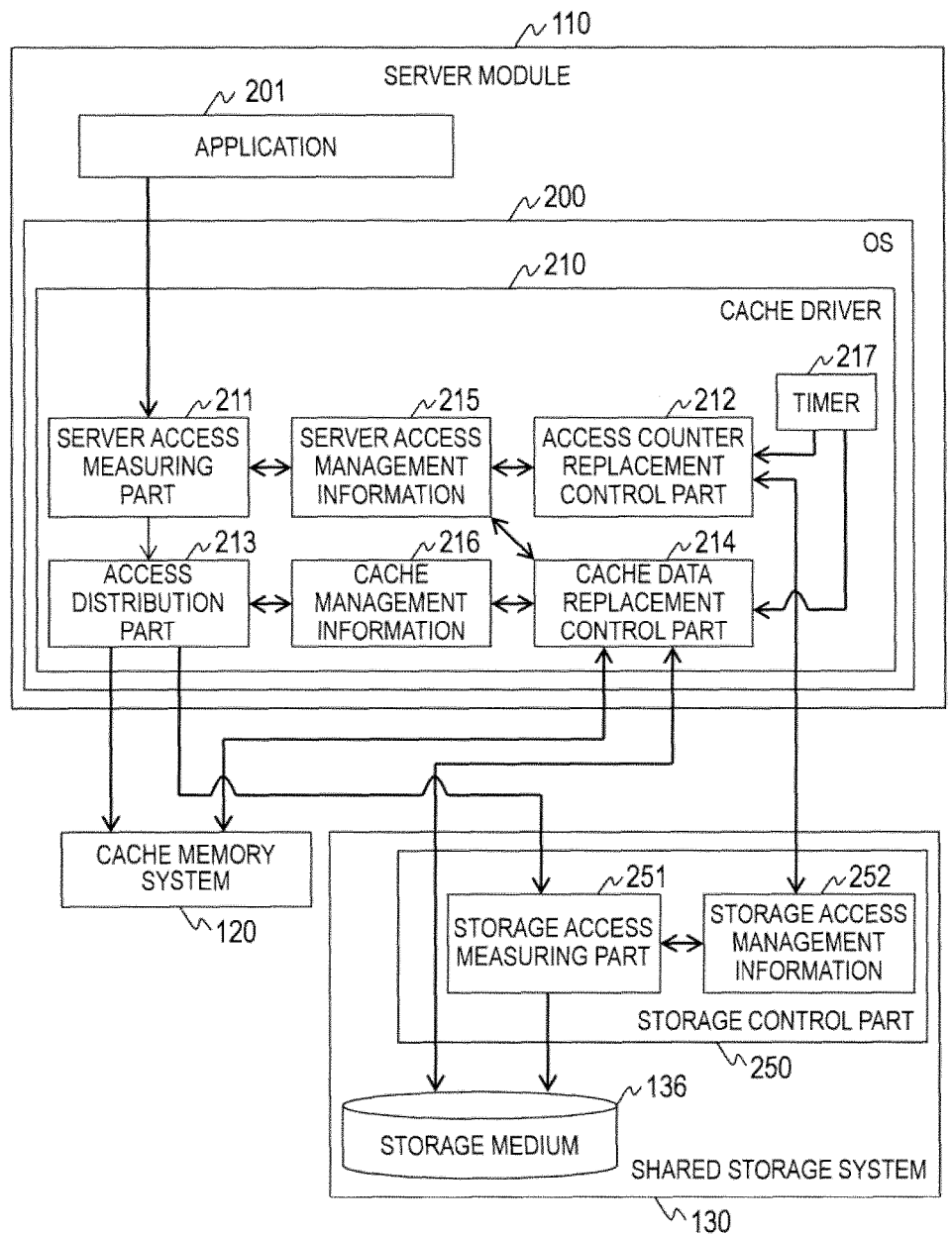
FIG. 2 is a diagram illustrating an example of a software configuration of the computer system according to the first embodiment.

FIG. 1 is a block diagram illustrating an example of a hardware configuration of a computer system according to the first embodiment of the present invention. FIG. 2 is a diagram illustrating an example of a software configuration of the computer system according to the first embodiment of the present invention.

The computer system of the present invention includes a server apparatus 10 and a shared storage system 130. The server apparatus 10 and the shared storage system 130 are connected via a network 140. The network 140 may be a WAN, a LAN, a SAN, or the like. The present invention is not limited to the type of the network. The server apparatus 10 and the shared storage system 130 may be connected directly to each other.

The server apparatus 10 includes a plurality of server modules 110 and a cache memory system 120. It is assumed that the server module 110 and the cache memory system 120 use the connection specifications compliant to the PCI Express (PCIe) formulated by PCI-SIG, for example.

The server module 110 is a computer that executes a predetermined application 201 and includes a processor 111, a memory 112, a network interface 113, and a connection interface 114. These constituent components are connected to each other via an internal path. The server module 110 may further include another constituent component (not illustrated) such as a storage medium or an input-output device.

The processor 111 executes a program stored in the memory 112. The functions of the server module 110 are realized when the processor 111 executes the program stored in the memory 112.

The memory 112 stores the program executed by the processor 111 and information required for execution of the program. Moreover, the memory 112 includes a work area used by the program. The program and the information stored in the memory 112 will be described later.

The network interface 113 is an interface for connecting to another device via the network 140.

The connection interface 114 is an interface for connecting to the cache memory system 120. As described above, in the present embodiment, it is assumed that the server module 110 and the cache memory system 120 are connected via a communication path connected to a PCIe bus. In this case, a PCIe interface is used as the connection interface 114.

The cache memory system 120 provides a storage area that the server module 110 uses. The cache memory system 120 is made up of nonvolatile memories (nonvolatile storage devices) such as flash memories. The cache memory system 120 includes a controller (not illustrated) for performing control on the nonvolatile memories.

In the present embodiment, the storage area provided by the cache memory system 120 is used as caches of the shared storage system 130. More specifically, cache data of logical block units (LU: logical unit) is stored in the storage area provided by the cache memory system 120.

A method of using buffer caches can be considered as an example of a method of managing data in logical block units. A buffer cache is generated by allocating a buffer page to the storage areas of the cache memory system 120 and partitioning the buffer page into block buffers having a predetermined block size.

The buffer cache includes a buffer head for specifying a storage location of data in logical block units of the shared storage system 130. The LU is provided by the shared storage system 130, which will be described later.

In the following description, a logical block is also referred to simply as a block, data in logical block units is also referred to as block data, and a storage area in logical block units of the cache memory system 120 is also referred to as a cache area.

Moreover, in the present embodiment, it is assumed that a plurality of server modules 110 shares the cache memory system 120. The present invention is not limited to this, but one cache memory system 120 may be connected to one server module 110. Moreover, the cache memory system 120 may be present inside the server module 110. Further, the cache memory system 120 may be present outside the server apparatus 10.

Moreover, in the present embodiment, although the cache memory system 120 made up of nonvolatile memories is used, a cache memory system made up of volatile memories may be used.

The shared storage system 130 provides a storage area for storing data and the like that the application 201 executed on the respective server modules 110 uses. The shared storage system 130 includes a controller 131 and a plurality of storage medium 136.

The controller 131 controls the shared storage system 130. The controller 131 includes a processor 132, a memory 133, a network interface 134, and a storage interface 135, and these constituent components are connected to each other via an internal path.

The processor 132 executes a program stored in the memory 133. The functions of the shared storage system 130 are realized when the processor 132 executes the program stored in the memory 133.

The memory 133 stores the program executed by the processor 132 and information required for execution of the program. Moreover, the memory 133 includes a work area used by the program. The program and the information stored in the memory 133 will be described later.

The network interface 134 is an interface for connecting to another device via the network 140.

The storage interface 135 is an interface for connecting to the storage medium 136. The storage medium 136 is a device for storing data. Examples of the storage medium 136 include a hard disk drive (HDD), a solid state drive (SSD), or the like. An optional device may be used as long as the device can store data.

Next, a software configuration of the server module 110, the cache memory system 120, and the shared storage system 130 will be described.

First, a software configuration of the server module 110 will be described. The memory 112 of the server module 110 stores at least one applications 201 and a program that realizes an OS 200. The program is executed by the processor 111.

Examples of the application 201 include database software, a hypervisor, a virtual desktop infrastructure, and the like. The present invention is not limited to the type of the application 201.

The OS 200 controls the entire server module 110. The OS 200 includes the cache driver 210.

The OS 200 formats the LU provided by the shared storage system 130 into a predetermined file system. In this case, the OS 200 partitions the LU into predetermined logical blocks and allocates an identification number to the respective logical blocks. The file system manages data made up of at least one items of block data as files.

The file system and the like included in the OS 200 are already known in the art and description thereof will not be provided.

The cache driver 210 is a driver that controls cache data in cache areas. The cache driver 210 includes a server access measuring part 211, an access counter replacement control part 212, an access distribution part 213, a cache data replacement control part 214, and a timer 217 and stores server access management information 215 and cache management information 216.

The server access measuring part 211 measures the number of accesses to the storage areas (blocks) managed by the server module 110. The access counter replacement control part 212 replaces blocks of which the number of accesses is measured by the server module 110 based on predetermined conditions.

The access distribution part 213 distributes an output destination of an I/O request input from the application 201. The cache data replacement control part 214 controls replacement of data to be stored in the cache areas of the cache memory system 120.

The timer 217 manages the start of the operations of the access counter replacement control part 212 and the cache data replacement control part 214.

The server access management information 215 stores information on the number of accesses and the like to blocks managed by the server module 110. Details of the server access management information 215 will be described later with reference to FIG. 3.

The cache management information 216 stores information on the cache data stored in the cache memory system 120. Details of the cache management information 216 will be described later with reference to FIG. 4.

Next, a software configuration of the shared storage system 130 will be described. The memory 133 of the shared storage system 130 stores a program that realizes a storage control part 250. The program is executed by the processor 132.

The storage control part 250 controls the shared storage system 130. In the present embodiment, a RAID is formed using a plurality of storage medium 136. The storage control part 250 partitions a RAID volume logically to generate a plurality of LUs and provides the plurality of generated LUs to the server module 110. Moreover, the storage control part 250 stores management information (not illustrated) indicating correspondence between the LU and the storage medium 136.

Moreover, the storage control part 250 includes a storage access measuring part 251 and stores storage access management information 252.

The storage access measuring part 251 measures the number of accesses to the storage areas (block groups) managed by the shared storage system 130.

The storage access management information 252 stores information on the number of accesses and the like to the block groups managed by the shared storage system 130. Details of the storage access management information 252 will be described later with reference to FIG. 5.

Although the storage control part 250 has various functions such as a LU management function and a data transfer function, detailed description thereof will not be provided because the functions are already known in the art.

In the present embodiment, the storage control part 250 the number of accesses to all storage areas in respective block groups each made up of a plurality of blocks. Moreover, the cache driver 210 determines a block group in which the number of accesses is to be managed among the block groups accessed by the application 201 based on predetermined conditions and manages the number of accesses to the blocks that constitute the determined block group. That is, the cache driver 210 manages the number of accesses to partial storage areas (blocks) among all storage areas (all blocks of the LU) of the shared storage system 130.

In the following description, a block group determined as a block group in which the detailed number of accesses is to be managed among the block groups accessed by the application 201 will be referred to as a target block group, and a block group other than the target block group will be also referred to as a non-target block group.

Figure 3:
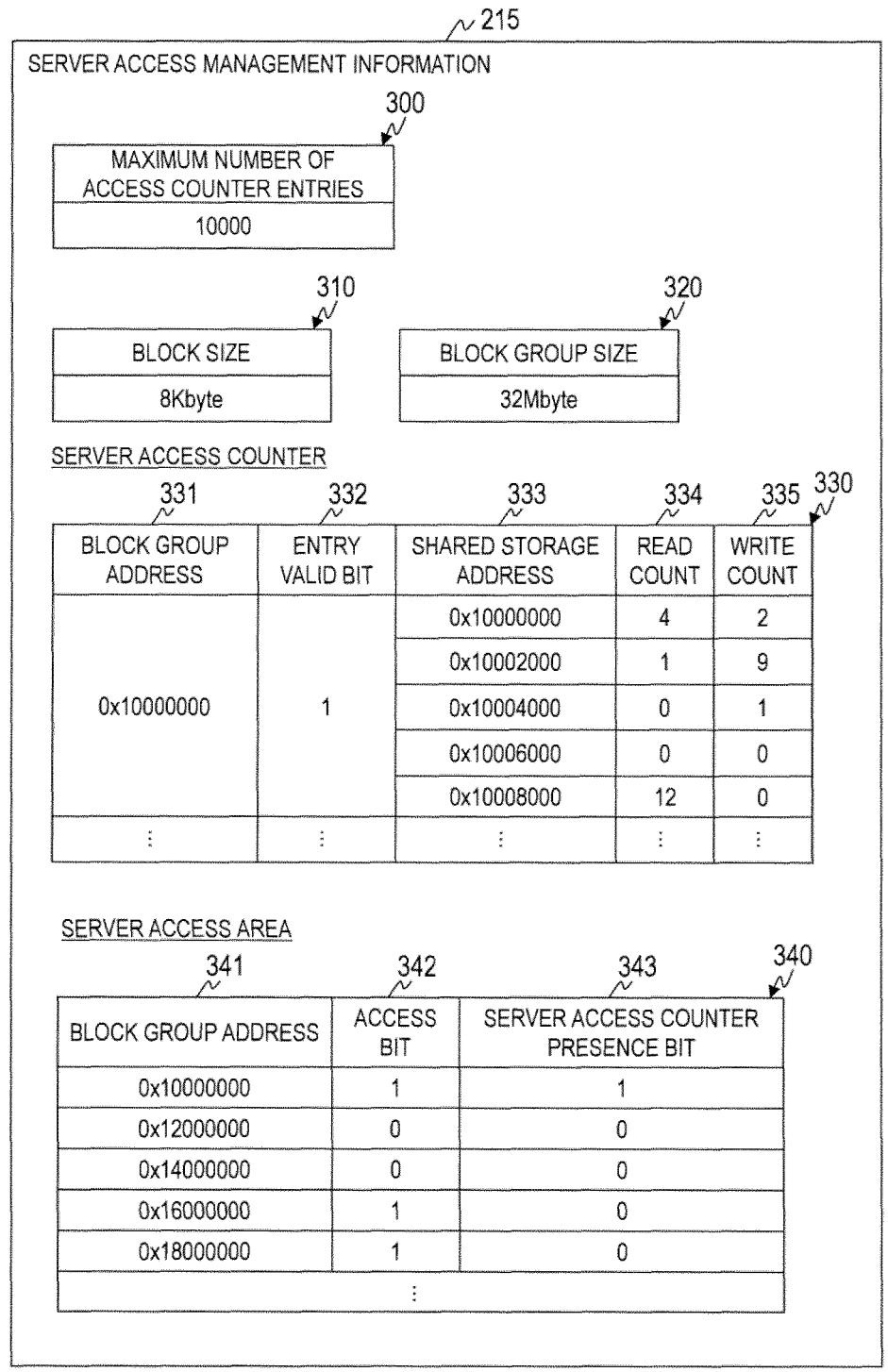
FIG. 3 is a diagram illustrating an example of server access management information according to the first embodiment.

FIG. 3 is a diagram illustrating an example of the server access management information 215 according to the first embodiment of the present invention.

The server access management information 215 includes a maximum number of access counter entries 300, a block size 310, a block group size 320, a server access counter 330, and a server access area 340.

The maximum number of access counter entries 300 is the number of entries that can be registered in the server access counter 330. That is, the maximum number of access counter entries 300 indicates the number of target block groups that the cache driver 210 can manage. As will be described later, in the present embodiment, the cache driver 210 determines a target block group within the range of the maximum number of access counter entries 300.

The block size 310 is the size of a block. In the present embodiment, data is stored in block units in the cache memory system 120. The block group size 320 is the size of a block group.

The server access counter 330 is information for managing the number of accesses to each of the blocks that constitute the target block group. The server access counter 330 includes a block group address 331, an entry valid bit 332, a shared storage address 333, a read count 334, and a write count 335.

In the present embodiment, it is assumed that the block group is made up of a plurality of blocks of which the addresses are successive. The configuration of the block group according to the present embodiment is an example, and the block group may be made up of a plurality of blocks of which the addresses are not successive.

The block group address 331 is the starting address of the block groups.

The entry valid bit 332 is a bit indicating whether an entry of a target block group corresponding to the block group address 331 is valid or not. In the present embodiment, in a case where the entry valid bit 332 is "1," it indicates that the entry is valid. In a case where the entry valid bit 332 is "0," it indicates that the entry is not valid.

In the entries of which the entry valid bit 332 is "0," information on a new target block group is stored in an access counter replacement operation described later.

The shared storage address 333 is the starting address of each of blocks that constitute a target block group corresponding to the block group address 331.

The read count 334 is the number of read operations on a block corresponding to the shared storage address 333. The write count 335 is the number of write operations on a block corresponding to the shared storage address 333.

The server access area 340 is information on a block group that the server module 110 has accessed. The server access area 340 includes a block group address 341, an access bit 342, and a server access counter presence bit 343.

The block group address 341 is the starting address of block groups.

The access bit 342 is a bit indicating whether a block group corresponding to the block group address 341 has been accessed or not.

In the present embodiment, in a case where the access bit 342 is "1," it indicates that the server module 110 has accessed a block group corresponding to the block group address 341. In a case where the access bit 342 is "0," it indicates that the server module 110 has not accessed a block group corresponding to the block group address 341.

The server access counter presence bit 343 is a bit indicating whether the number of accesses to a block that constitutes a block group corresponding to the block group address 341 has been managed or not. That is, the server access counter presence bit 343 is a bit indicating whether a block group corresponding to the block group address 341 has been registered in the server access counter 330 as a target block group.

In the present embodiment, in a case where the server access counter presence bit 343 is "1," it indicates that the entry of a block group corresponding to the block group address 341 has been registered in the server access counter 330. In a case where the server access counter presence bit 343 is "0," it indicates that the entry of a block group corresponding to the block group address 341 has not been registered in the server access counter 330.

Entries corresponding to all block groups managed by the storage control part 250 are registered in the server access area 340. Due to this, the server module 110 can be informed of which block group the module has accessed.

Figure 4:
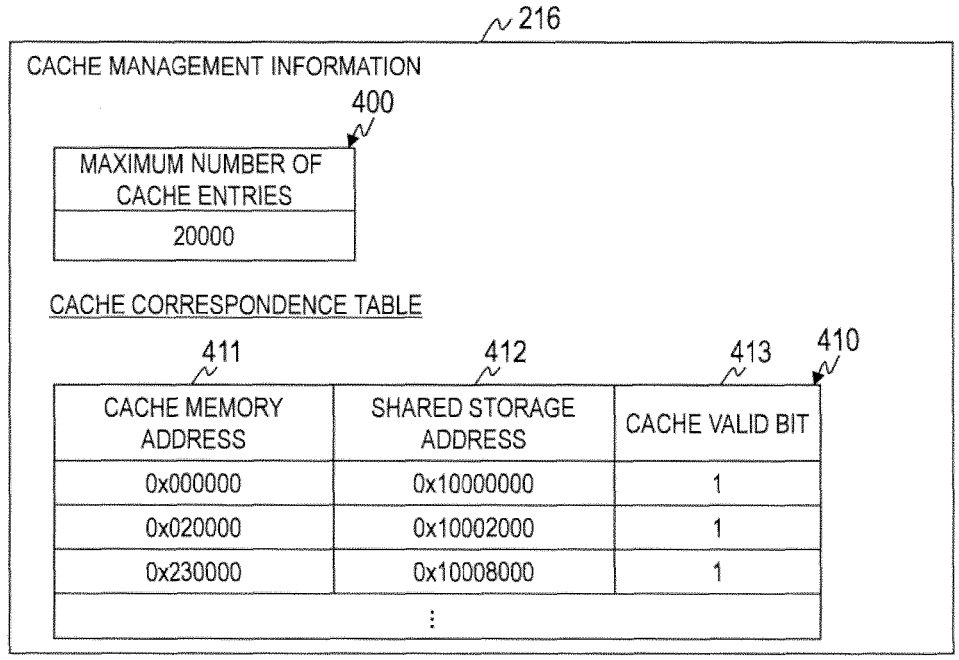
FIG. 4 is a diagram illustrating an example of cache management information according to the first embodiment.

FIG. 4 is a diagram illustrating an example of the cache management information 216 according to the first embodiment of the present invention.

The cache management information 216 includes a maximum number of cache entries 400 and a cache correspondence table 410.

The maximum number of cache entries 400 is the number of entries that can be registered in the cache correspondence table 410. That is, the maximum number of cache entries 400 indicates the number of cache areas managed by the cache driver 210.

The cache correspondence table 410 indicates correspondence between the address on the shared storage system 130 and the cache memory system 120. The cache correspondence table 410 includes a cache memory address 411, a shared storage address 412, and a cache valid bit 413.

The cache memory address 411 is the starting address of cache areas of the cache memory system 120.

The shared storage address 412 is a storage location (that is, the starting address of blocks) in the shared storage system 130, of the data stored in a cache area corresponding to the cache memory address 411.

The cache valid bit 413 is a bit indicating whether data that can be read into a cache area corresponding to the cache memory address 411 has been stored or not. In the present embodiment, in a case where the cache valid bit 413 is "1," it indicates that the data that can be read into a cache area has been stored. In a case where the cache valid bit 413 is "0," it indicates that the data that can be read into the cache area has not been stored.

Figure 5:
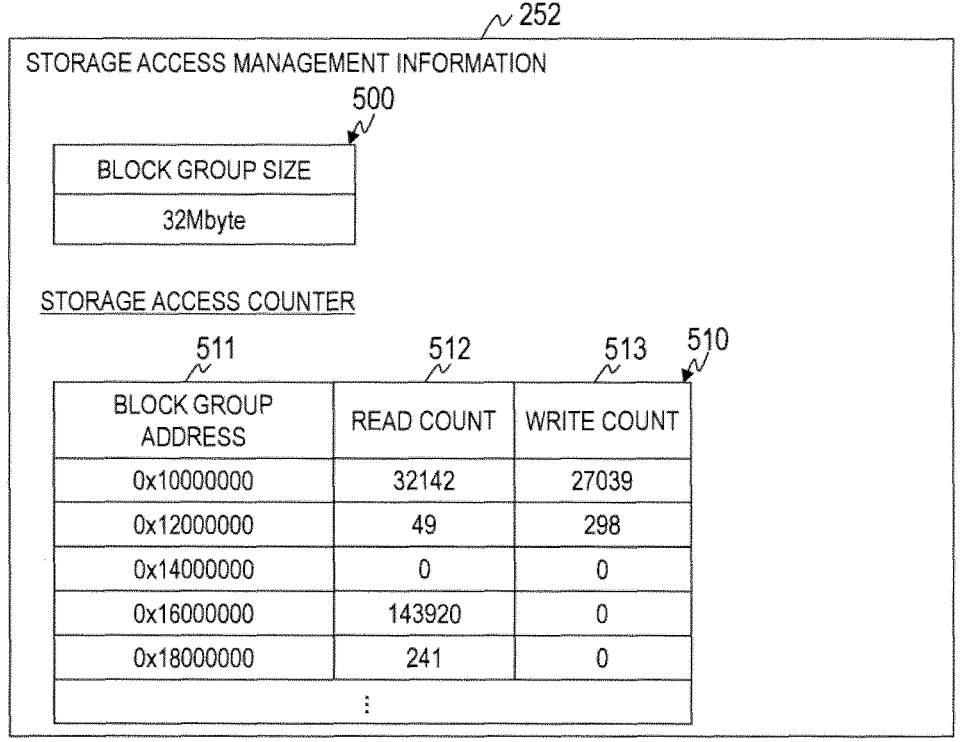
FIG. 5 is a diagram illustrating an example of storage access management information according to the first embodiment.

FIG. 5 is a diagram illustrating an example of the storage access management information 252 according to the first embodiment of the present invention.

The storage access management information 252 includes a block group size 500 and a storage access counter 510.

The block group size 500 is the size of a block group and is identical to the block group size 320 of the server access management information 215. In the present embodiment, the storage control part 250 manages the number of accesses in respective block groups.

The storage access counter 510 is information used for the storage control part 250 to manage the number of accesses in respective block groups. The storage access counter 510 includes a block group address 511, a read count 512, and a write count 513.

The block group address 511 is the starting address of block groups. The read count 512 is the number of read operations on a block group. The write count 513 is the number of write operations on a block group. The read count 512 and the write count 513 indicate the sums of the numbers of read operations and the numbers of write operations on the blocks that constitute a block group, respectively.

In the present embodiment, it is assumed that one items of storage access management information 252 is stored for a plurality of server modules 110. The storage control part 250 may store the storage access management information 252 for respective server modules 110.

As illustrated in FIGS. 3 and 4, the cache driver 210 manages the number of accesses in respective block units with respect to a partial block group (target block group) among the block groups accessed by the application 201 and performs cache control on the cache memory system 120 based on the number of accesses to the block that constitutes the partial block group.

Moreover, as illustrated in FIG. 5, the storage control part 250 manages the number of block group-based accesses.

Figure 6:
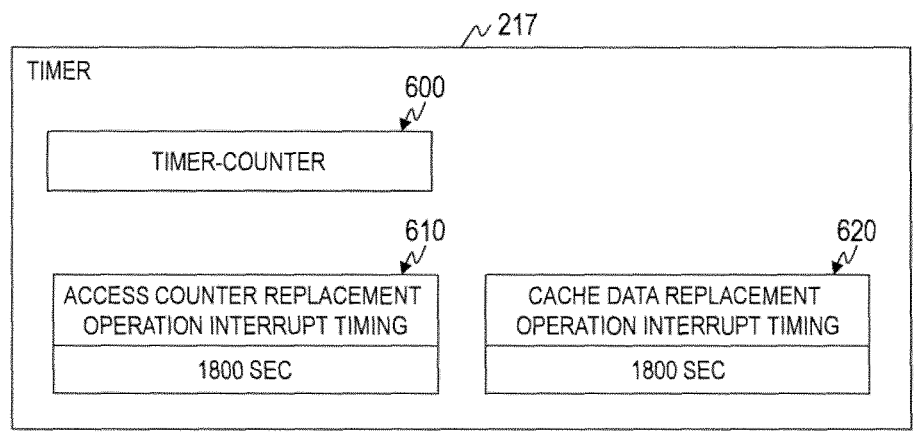
FIG. 6 is a diagram illustrating a configuration example of timer according to the first embodiment.

FIG. 6 is a diagram illustrating a configuration example of the timer 217 according to the first embodiment of the present invention.

The timer 217 includes a timer/counter 600, an access counter replacement operation interrupt timing 610, and a cache data replacement operation interrupt timing 620.

The access counter replacement operation interrupt timing 610 is an execution timing of an access counter replacement operation described later. The cache data replacement operation interrupt timing 620 is an execution timing of a cache data replacement operation described later.

The timer/counter 600 instructs the start of operations according to respective interrupt timings. Specifically, the timer/counter 600 causes the access counter replacement control part 212 to generate an interrupt to start operations every period indicated by the access counter replacement operation interrupt timing 610 and causes the cache data replacement control part 214 to generate an interrupt to start operations every period indicated by the cache data replacement operation interrupt timing 620.

In the present embodiment, the access management information (access counter) for managing the measured number of accesses is divided into two items of information, which are the server access management information 215 and the storage access management information 252.

In the storage access management information 252, the numbers of accesses to all storage areas of the shared storage system 130 are managed in respective block group units. On the other hand, in the server access management information 215, the number of accesses to a partial block group of the shared storage system 130 is managed in respective block units.

Due to this, the server module 110 can reduce the consumed capacity of the memory 112 as compared to a case where the numbers of accesses to all storage areas of the shared storage system 130 are managed in respective block units. Moreover, since the shared storage system 130 itself manages the number of accesses, the shared storage system 130 can determine arrangement of data in the shared storage system 130 independently using the number of accesses.

In order to realize the access count management method described above, the server module 110 needs to appropriately determine a storage area (target block group) in which the number of accesses is to be managed in respective block units among the storage areas (block groups) of the shared storage system 130 and to dynamically change the target block group according to an access state.

Next, operations executed in a case where an I/O request is issued from the application 201 will be described with reference to FIGS. 7, 8, and 9.

Figure 7:
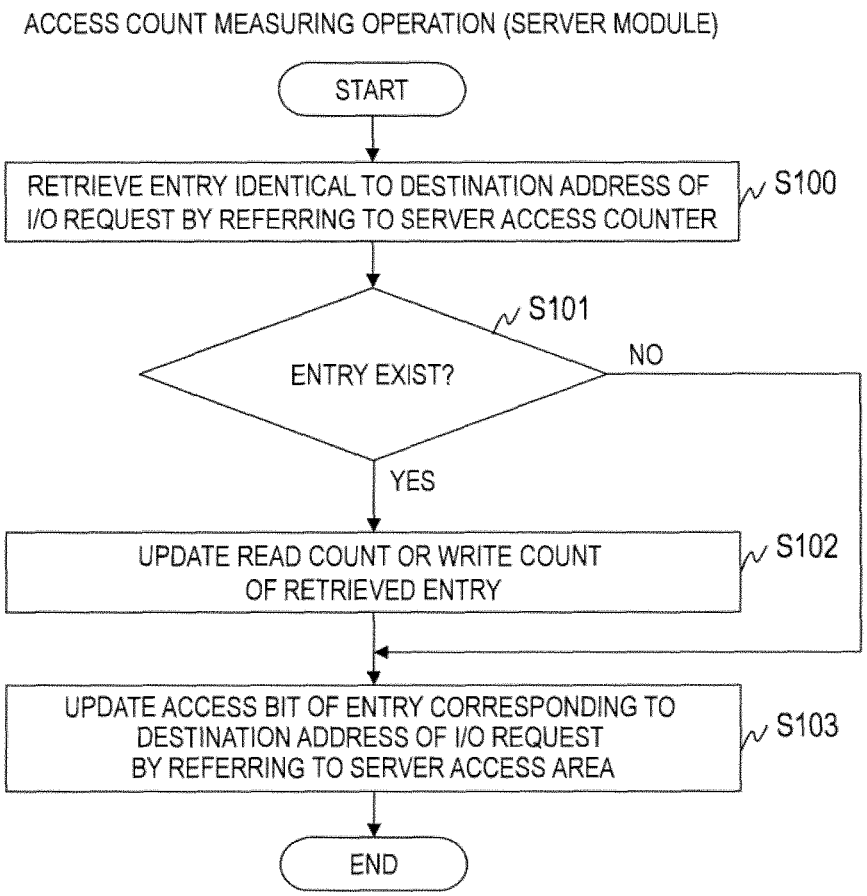
FIG. 7 is a flowchart illustrating an access count measuring operation executed by a server access measuring part according to the first embodiment.

FIG. 7 is a flowchart illustrating an access count measuring operation executed by the server access measuring part 211 according to the first embodiment of the present invention.

In a case where an I/O request is issued from the application 201, first, the I/O request is input to the server access measuring part 211 of the cache driver 210. In this case, the server access measuring part 211 starts the access count measuring operation.

The server access measuring part 211 retrieves an entry identical to a destination address of the I/O request by referring to the server access counter 330 (step S100).

Specifically, the server access measuring part 211 retrieves an entry of which the shared storage address 333 is identical to a destination address of the I/O request.

In the present embodiment, the cache driver 210 manages the number of accesses to a partial storage area (block that constitutes the target block group) only among all storage areas of the shared storage system 130. Due to this, the number of accesses to the block that constitutes the target block group of the shared storage system 130 is stored in the server access management information 215. Thus, in a case where the destination address of the I/O request is not the address indicating the block that constitutes the target block group, no entry identical to the destination address of the I/O request is present in the server access counter 330.

Hereinafter, operations executed by the cache driver 210 and the storage control part 250 according to the first embodiment will be described.

The server access measuring part 211 determines whether an entry identical to the destination address of the I/O request exists present in the server access counter 330 based on retrieval results (step S101).

In a case where it is determined that an entry identical to the destination address of the I/O request is not present in the server access counter 330, the server access measuring part 211 proceeds to step S103.

In a case where it is determined that an entry identical to the destination address of the I/O request is present in the server access counter 330, the server access measuring part 211 adds "1" to the value of the read count 334 or the write count 335 of the entry based on the type of the I/O request (step S102).

Specifically, in a ease where the type of the I/O request is "READ," the server access measuring part 211 adds "1" to the value of the read count 334. In a case where the type of the I/O request is "WRITE," the server access measuring part 211 adds "1" to the value of the write count 335.

The server access measuring part 211 updates the access bit 342 of the entry corresponding to the destination address of the I/O request by referring to the server access area 340 (step S103) and ends the operation. Specifically, the following operations are executed.

The server access measuring part 211 retrieves an entry corresponding to a block group to which the destination address of the I/O request belongs by referring to the block group address 341 of the server access area 340. For example, in a case where the address of the I/O request is "0x10002000," an entry at top of the server access area 340 illustrated in FIG. 3 is retrieved as the entry corresponding to the destination address.

The server access measuring part 211 refers to the access bit 342 of the retrieved entry and updates the access bit 342 to "1" if the bit is "0". In a case where the access bit 342 is "1," no particular operation is executed.

Hereinabove, the operation of steps S103 has been described. The operation results of step S103 are used by the access counter replacement control part 212 as will be described later.

Figure 8:
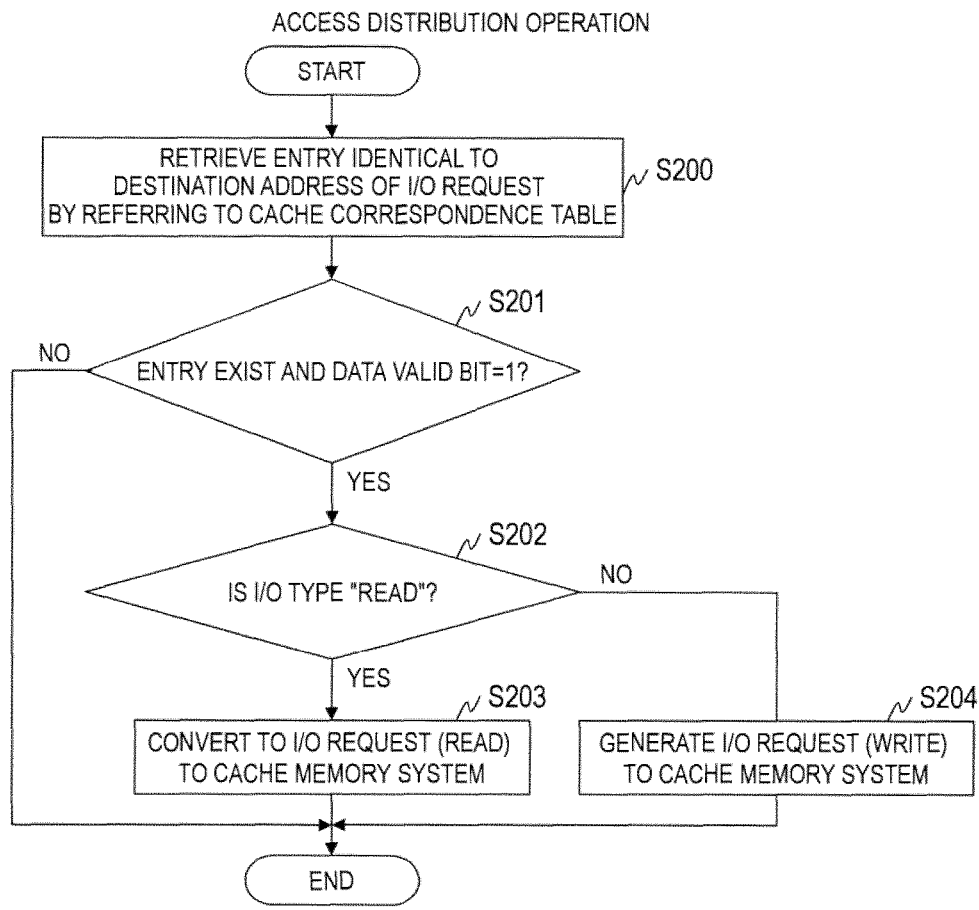
FIG. 8 is a flowchart illustrating an access distribution operation executed by an access distribution part according to the first embodiment.

FIG. 8 is a flowchart illustrating an access distribution operation executed by the access distribution part 213 according to the first embodiment of the present invention.

The I/O request is also input to the access distribution part 213 subsequently to the server access measuring part 211. In this case, the access distribution part 213 starts the access distribution operation.

First, the access distribution part 213 retrieves an entry identical to the destination address of the I/O request by referring to the cache correspondence table 410 of the cache management information 216 (step S200).

Specifically, the access distribution part 213 retrieves an entry of which the shared storage address 412 is identical to the destination address of the I/O request. In a case where the entry exists, the access distribution part 213 determines whether the cache valid bit 413 of the retrieved entry is "1".

The access distribution part 213 determines whether an entry identical to the destination address of the I/O request exists in the cache correspondence table 410 and the cache valid bit 413 of the entry is "1" based on the retrieval results (step S201). That is, it is determined whether block data of a block corresponding to the destination address of the I/O request is stored in the cache memory system 120.

In a case where the entry identical to the destination address of the I/O request does not exist in the cache correspondence table 410, or in a case where the entry identical to the destination address of the I/O request exists in the cache correspondence table 410, but the cache valid bit 413 of the entry is not "1," the access distribution part 213 outputs the input I/O request to the shared storage system 130 and ends the operation. That is, in a case where the target block data is not stored in the cache memory system 120, the I/O request is sent to the shared storage system 130 as it was.

In a case where it is determined that the entry identical to the destination address of the I/O request is present in the cache correspondence table 410 and the cache valid bit 413 of the entry is "1" (that is, it is determined that the target block data of the I/O request is stored in the cache memory system 120), the access distribution part 213 determines whether the type of the I/O request is "READ" or not (step S202).

In a case where it is determined that the type of the I/O request is "READ," the access distribution part 213 converts the I/O request into an I/O request (read request) to the cache memory system 120 (step S203) and ends the operation.

Specifically, the access distribution part 213 changes the destination address of the I/O request to a storage address in the cache memory address 411, of the entry retrieved in step S200. Further, the access distribution part 213 inputs the converted I/O request to the cache memory system 120.

In this way, the target block data of the I/O request is read from the cache memory system 120.

In a case where it is determined in step S202 that the type of the I/O request is "WRITE," the access distribution part 213 generates an I/O request (write request) to the cache memory system 120 (step S204) and ends the operation.

Specifically, the access distribution part 213 generates an I/O request in which a storage address in the cache memory address 411, of the entry retrieved in step S200 is set to the destination address of the I/O request. Further, the access distribution part 213 inputs the initially input I/O request to the shared storage system 130 and inputs the newly generated I/O request to the cache memory system 120.

In this way, both items of the block data stored in the shared storage system 130 and the cache memory system 120 are updated.

The reason why the I/O request is also sent to the shared storage system 130 in step S204 is because, in a case where a fault occurs in the cache memory system 120, it is possible to obtain updated data from the shared storage system 130 and to improve data availability.

Instead of the operation of step S204, the access distribution part 213 may execute an operation of disabling the entry by changing the cache valid bit 413 of the entry retrieved from the cache correspondence table 410 to "0" or an operation of changing the destination address of the I/O request to the cache memory system 120.

Figure 9:
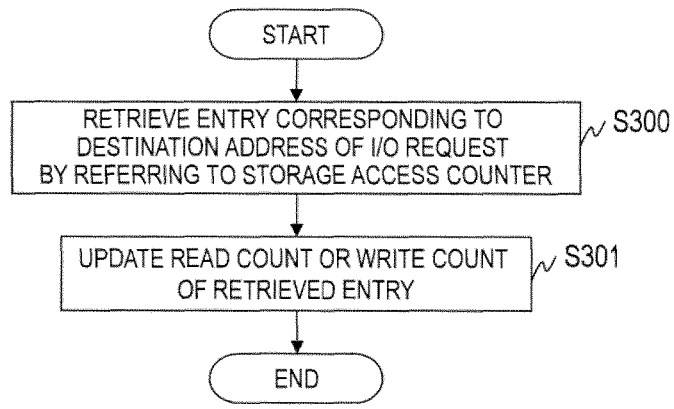
FIG. 9 is a flowchart illustrating an access measuring operation executed by a storage access measuring part according to the first embodiment.

FIG. 9 is a flowchart illustrating an access measuring operation executed by the storage access measuring part 251 according to the first embodiment of the present invention.

In a case of receiving the I/O request output from the server module 110, the storage control part 250 inputs the I/O request to the storage access measuring part 251. In this case, the storage access measuring part 251 starts the access measuring operation.

The storage access measuring part 251 retrieves an entry corresponding to the destination address of the I/O request by referring to the storage access counter 510 (step S300).

Specifically, the storage access measuring part 251 retrieves an entry corresponding to a block group to which the destination address of the I/O request belongs by referring to the block group address 511 of the storage access counter 510.

Since the numbers of accesses to all storage areas (all block groups) of the shared storage system 130 are managed in the storage access counter 510, at least one entries will always be retrieved in the operation of step S300.

The storage access measuring part 251 adds "1" to the value of the read count 512 or the write count 513 of the retrieved entry based on the type of the I/O request (step S301) and ends the operation.

Specifically, in a case where the type of the I/O request is "READ," the storage access measuring part 251 adds "1" to the value of the read count 512. In a case where the type of the I/O request is "WRITE," the storage access measuring part 251 adds "1" to the value of the write count 513.

As described with reference to FIGS. 7, 8, and 9, in response to the I/O request issued from the application 201, the server access measuring part 211 measures the number of accesses in respective block units, the storage access measuring part 251 measures the number of accesses in respective block group units, and the access distribution part 213 determines whether a cache hit or a cache miss occurs.

Hereinafter, the access counter replacement operation will be described with reference to FIG. 10, and a cache data replacement operation will be described with reference to FIG. 11.

Figure 10:
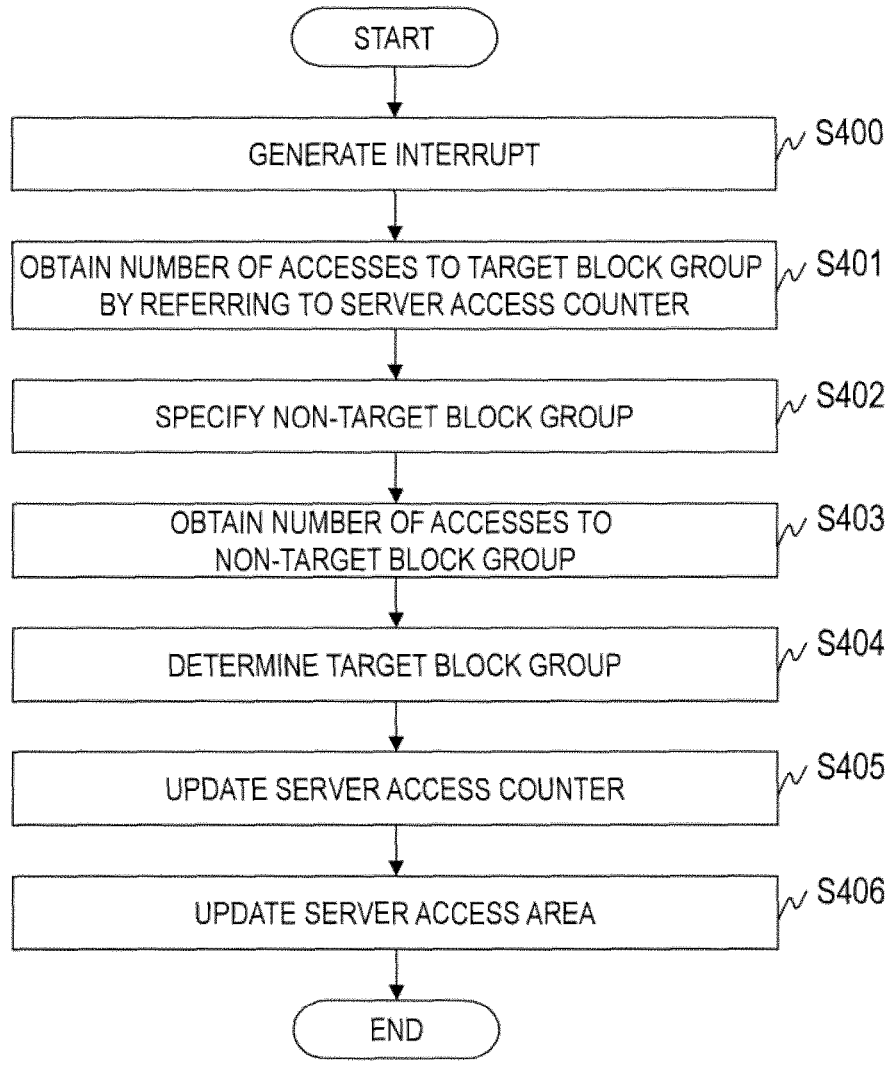
FIG. 10 is a flowchart illustrating an access counter replacement operation executed by an access counter replacement control part according to the first embodiment.

FIG. 10 is a flowchart illustrating the access counter replacement operation executed by the access counter replacement control part 212 according to the first embodiment of the present invention.

In the access counter replacement operation, the access counter replacement control part 212 specifies a block group accessed by the application 201 and determines a target block group based on the number of accesses to the specified block group.

In this case, the number of accesses to the target block group is obtained from the server access management information 215, and the number of accesses to the non-target block group is obtained from the storage access management information 252. This is because of the following reasons.

(Reason 1)

Blocks that constitute the target block group are subjected to cache control. Thus, in a case where block data of blocks that constitute the target block group is stored in the cache memory system 120, since the number of accesses to the block data is managed by the server module 110, the shared storage system 130 cannot be informed of the exact number of accesses. For example, In a case where target data of a read request is stored in the cache memory system 120, since the read request is not sent to the shared storage system 130, the shared storage system 130 cannot be informed of the read request. Thus, the number of accesses to the target block group is obtained from the server access management information 215.

(Reason 2)

On the other hand, since the server module 110 manages the number of accesses to the target block group only, the server module 110 cannot be informed of the number of accesses to the non-target block group. Thus, the number of accesses to the non-target block group is obtained from the storage access management information 252.

Hereinafter, the details of the access counter replacement operation will be described.

The timer/counter 600 causes the access counter replacement control part 212 to generate an interrupt to notify the start of operations according to the access counter replacement operation interrupt timing 610.

In a case of receiving the interrupt from the timer/counter 600 (step S400), the access counter replacement control part 212 starts the operation.

The access counter replacement control part 212 obtains the number of accesses to the target block group by referring to the server access counter 330 (step S401).

Specifically, the access counter replacement control part 212 obtains the numbers of accesses to blocks that constitute the target block group by referring to the server access counter 330 and calculate the sum of the obtained numbers of accesses to respective blocks. That is, the access counter replacement control part 212 obtains the read counts 334 and the write counts 335 of the respective shared storage addresses 333 included in the block group address 331 and calculates the sum of the obtained read counts 334 and the sum of the obtained write counts 335.

For example, in the example illustrated in FIG. 3, the read count of a block group of which the block group address 331 is "0x10000000" is calculated as "17" by summing the read counts 334 of five blocks corresponding to the shared storage address 333. Moreover, the write count of the block group is calculated as "12" by summing the write counts 335 of five blocks corresponding to the shared storage address 333.

The access counter replacement control part 212 specifies a non-target block group among the block groups that include blocks accessed by the server module 110 (step S402). This is because, the server module 110 manages the number of accesses to a partial block group only (that is, the target block group).

Specifically, the access counter replacement control part 212 retrieves an entry of which the access bit 342 is "1" and the server access counter presence bit 343 is "0" by referring to the server access area 340.

Here, in the present embodiment, in the storage access management information 252, the numbers of accesses to the block groups accessed by the plurality of server modules 110 are also managed. Due to this, the server module 110 has only to obtain the number of accesses to the block group that the module itself has accessed. Thus, in step S402, the access counter replacement control part 212 retrieves a non-target block group among the entries of which the access bit 342 is "1".

The access counter replacement control part 212 obtains the number of accesses to the specified non-target block group from the shared storage system 130 (step S403).

Specifically, the access counter replacement control part 212 sends an acquisition request including the block group address 341 of the retrieved entry to the shared storage system 130.

In this case, upon receiving the acquisition request, the storage control part 250 retrieves an entry of which the block group address 511 is identical to the block group address 341 included in the acquisition request by referring to the storage access counter 510 of the storage access management information 252. Further, the storage control part 250 sends the read count 512 and the write count 513 of the retrieved entry to the access counter replacement control part 212.

Subsequently, the access counter replacement control part 212 determines a block group (that is, a target block group) to be registered in the server access counter 330 based on the numbers of accesses to the block group, obtained from the server access counter 330 and the storage access counter 510 (step S404).

For example, the access counter replacement control part 212 determines the target block group within the range of the maximum number of access counter entries 300 in descending order of the sums of the read count and the write count of the block group.

The determination method described above is an example, and the present invention is not limited to this. For example, the target block group may be determined in descending order of the read counts.

The access counter replacement control part 212 replaces the target block group by updating the server access counter 330 based on the information on the determined target block group (step S405). Specifically, the following operations are executed.

The access counter replacement control part 212 compares the address of the target block group before replacement with the address of the target block group determined in step S404 to specify a block group to be excluded from the target block group (that is, a block group to be removed from the server access counter 330). Further, the access counter replacement control part 212 sets "0" to the entry valid bit 332 of the entries of the removed block group.

The access counter replacement control part 212 registers entries corresponding to a target block group which is not registered in the server access counter 330 among the target block groups determined in step S404 in the server access counter 330.

More specifically, the access counter replacement control part 212 sets the addresses of the target block groups which are not registered to the block group address 331 of the entries of which the entry valid bit 332 is "0". Further, the access counter replacement control part 212 segments the block group into respective blocks and sets the addresses of the respective blocks to the shared storage address 333 of the entries. Further, the access counter replacement control part 212 sets an initial value to the read count 334 and the write count 335 of the entries.

An initial value of "0" may be set to the read count 334 and the write count 335, for example, and a value calculated based on Mathematical Formulas (2) and (3) below may be set.

The values of the read count 512, the block group size 320, and the block size 310 are substituted into the read count, block group size, and block size of Mathematical Formula (2). Moreover, the values of the write count 513, the block group size 320, and the block size 310 are substituted into the write count, block group size, and block size of Mathematical Formula (3).

Mathematical Formula (2)

$$(\text{Initial value of read count}) = \frac{(\text{Read count})}{(\text{Block group size})} \times (\text{Block size}) \quad (2)$$

Mathematical Formula (3)

$$(\text{Initial value of write count}) = \frac{(\text{Write count})}{(\text{Block group size})} \times (\text{Block size}) \quad (3)$$

After that the access counter replacement control part 212 sets "1" to the entry valid bit 332 of entries corresponding to the target block group newly registered in the server access counter 330.

Hereinabove, the operation of step S405 has been described.

Subsequently, the access counter replacement control part 212 updates the server access area 340 (step S406) and ends the operation.

Specifically, the access counter replacement control part 212 sets "0" to the access bit 342 of all entries of the server access area 340. Further, the access counter replacement control part 212 sets "1" to the server access counter presence bit 343 of an entry corresponding to the target block group which is registered in the server access counter 330 and sets "0" to the server access counter presence bit 343 of an entry corresponding to a non-target block group which is not registered in the server access counter 330.

In a case where the storage control part 250 stores the storage access management information 252 for each server module 110, the access counter replacement control part 212 may send identification information of the server module 110 rather than performing the operation of step S402. In this case, the storage control part 250 sends the storage access management information 252 corresponding to the server module 110 to the access counter replacement control part 212.

Figure 11:
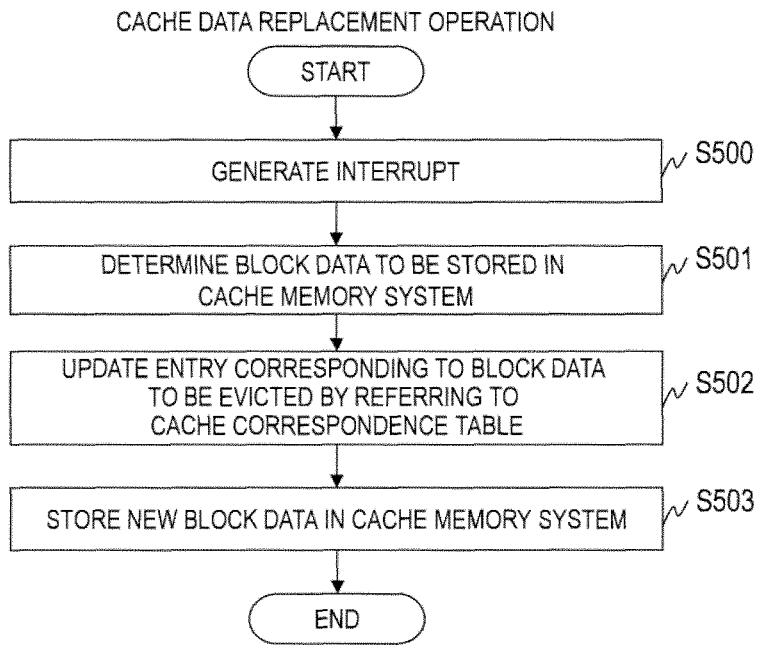
FIG. 11 is a flowchart illustrating a cache data replacement operation executed by a cache data replacement control part according to the first embodiment.

FIG. 11 is a flowchart illustrating the cache data replacement operation executed by the cache data replacement control part 214 according to the first embodiment of the present invention.

The timer/counter 600 causes the cache data replacement control part 214 to generate an interrupt to notify the start of operations according to the cache data replacement operation interrupt timing 620.

In a case of receiving the interrupt from the timer/counter 600, the cache data replacement control part 214 starts the operation (step S500).

The cache data replacement control part 214 determines block data to be stored in the cache memory system 120 based on the server access counter 330 (step S501). Specifically, the following operations are executed.

The cache data replacement control part 214 obtains the read count 334 and the write count 335 of each shared storage address 333 (that is, for each block) by referring to the server access counter 330. That is, the read counts and the write counts of respective blocks are obtained.

The cache data replacement control part 214 determines block data to be stored in the cache memory system 120 within the range of the maximum number of cache entries 400 based on the read count and the write count of each block.

For example, the block data may be determined according to a method of determining the same in descending order of the sums of the read counts 334 and the write count 335 or in descending order of the values of the read counts 334 or a method of determining the same based on the weighted read count 334 and the weighted write count 335. The methods described above are examples, and the present invention is not limited to these method.

Hereinabove, the operation of step S501 has been described.

Subsequently, the cache data replacement control part 214 updates the entry corresponding to the block data to be evicted from the cache area based on the operation results of step S501 by referring to the cache correspondence table 410 (step S502). Specifically, the following operations are executed.

The cache data replacement control part 214 compares a list (first address list) of addresses of block data stored currently in the cache area and a list (second address list) of addresses of block data newly stored in the cache area.

The cache data replacement control part 214 retrieves block data which is not included in the second address list among items of block data stored currently in the cache area based on the comparison results. The cache data replacement control part 214 determines the retrieved block data as block data to be evicted from the cache area.

The cache data replacement control part 214 sets "0" to the cache valid bit 413 of the entry of which the cache memory address 411 is identical to the address of the cache area in which the determined block data is to be stored by referring to the cache correspondence table 410.

Hereinabove, the operation of step S502 has been described.

The cache data replacement control part 214 stores new block data in the cache memory system 120 (step S503) and ends the operation. Specifically, the following operations are executed.

The cache data replacement control part 214 registers the address of the new block data in the shared storage system 130 in the shared storage address 412 of the entry of which the cache valid bit 413 is "0".

The cache data replacement control part 214 reads the block data from the storage area (block) corresponding to the shared storage address 412 of the entry and stores the read data in the cache area corresponding to the cache memory address 411. Moreover, the cache data replacement control part 214 sets "1" to the cache valid bit 413 of the entry.

In a case where a write request to a cache area in which the new block data is to be stored is issued during execution of the cache data replacement operation, the cache data replacement control part 214 performs control such that the write operation to the cache memory system 120 is canceled, and instead of this, a write operation is performed on the cache area.

An initialization operation of the computer system according to the first embodiment will be described with reference to FIG. 12.

Figure 12:
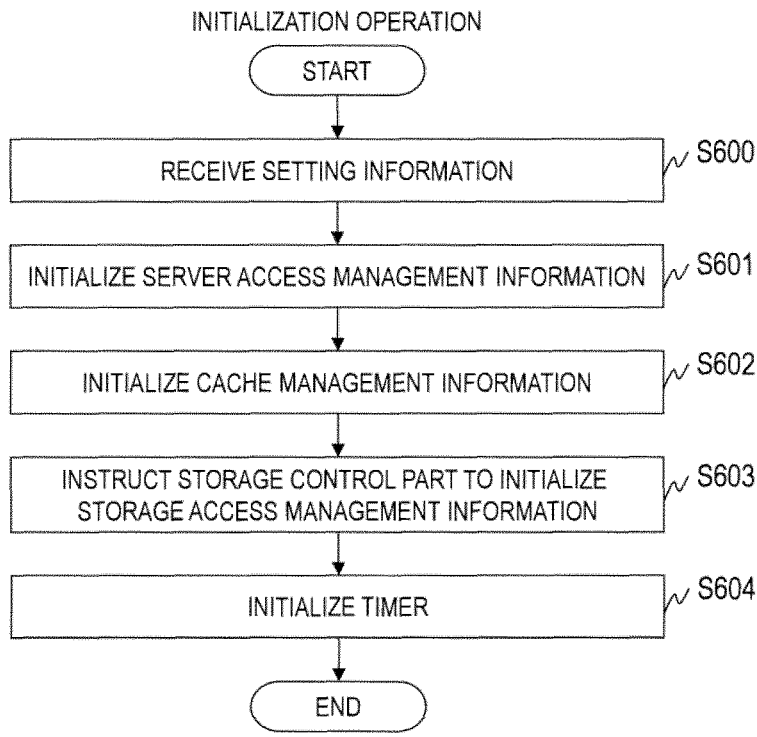
FIG. 12 is a flowchart illustrating an initialization operation executed by a cache driver according to the first embodiment.

FIG. 12 is a flowchart illustrating an initialization operation executed by the cache driver 210 according to the first embodiment of the present invention.

In a case of receiving the input of setting information from an administrator (step S600), the cache driver 210 starts the initialization operation.

The setting information includes the number of entries of the server access counter 330, a block size, a block group size, a cache capacity of the cache memory system 120, an address range of the cache areas of the cache memory system 120, an address range of the storage areas of the shared storage system 130, an execution interval of the access counter replacement operation, an execution interval of the cache data replacement operation, and the like.

The administrator may input the setting information directly to the server module 110 and may input the setting information using an administrator server not illustrated).

The cache driver 210 initializes the server access management information 215 based on the setting information (step S601). Specifically, the following operations are executed.

The cache driver 210 sets the number of entries of the server access counter 330 included in the setting information to the maximum number of access counter entries 300. The cache driver 210 sets the block size and the block group size included in the setting information to the block size 310 and the block group size 320, respectively.

The cache driver 210 generates a number of entries corresponding to the maximum number of access counter entries 300 in the server access counter 330 and sets "0" to the entry valid bit 332 of the generated entries.

The cache driver 210 generates entries of which the address is set for each block group size in the block group address 341 of the server access area 340 based on the block group size and the address range of the storage areas of the shared storage system 130. Moreover, the cache driver 210 sets "0" to the access bit 342 and the server access counter presence bit 343 of the generated entries.

Hereinabove, the operation of step S601 has been described.

Subsequently, the cache driver 210 initializes the cache management information 216 (step S602). Specifically, the following operations are executed.

The cache driver 210 sets a value calculated according to Mathematical Formula (4) to the maximum number of cache entries 400. The value of the block size 310 is substituted into the block size of Mathematical Formula (4). Moreover, the cache capacity of the cache memory system 120 included in the setting information is substituted into the cache capacity of the cache memory system of Mathematical Formula (4).

Mathematical Formula (4)

$$\text{(Maximum number of cache entries)} = \frac{\text{(Cache capacity of cache memory system)}}{\text{(Block size)}} \quad (4)$$

The cache driver 210 generates entries of which the address is set for each block size in the cache memory address 411 of the cache correspondence table 410 based on the block size and the address range of the storage areas of the cache memory system 120. Moreover, the cache driver 210 sets "0" to the cache valid bit 413 of the generated entries.

Hereinabove, the operation of step S602 has been described.

Subsequently, the cache driver 210 sends the setting information to the storage control part 250 to instruct the storage control part 250 to initialize the storage access management information 252 (step S603).

In this case, the storage control part 250 sets the block group size included in the setting information to the block group size 500. Moreover, the storage control part 250 generates entries of which the address is set for each block group size in the block group address 511 of the storage access counter 510 based on the block group size and the address range of the storage areas of the shared storage system 130. Moreover, the storage control part 250 sets "0" to the read count 512 and the write count 513 of the generated entries.

It is assumed that an initialization operation of the shared storage system 130 such as RAID configuration and LU configuration is executed before the initialization operation of the cache driver 210 is executed. Since the initialization of the shared storage system 130 may be performed using the existing techniques, detailed description thereof will not be provided.

The cache driver 210 initializes the timer 217 (step S604) and ends the operation.

Specifically, the cache driver 210 sets the execution interval of the access counter replacement operation and the execution interval of the cache data replacement operation included in the setting information to the access counter replacement operation interrupt timing 610 and the cache data replacement operation interrupt timing 620, respectively.

As described above, according to the first embodiment, the server module 110 manages the number of accesses in respective block units on only a partial storage area (target block group) among the storage areas of the shared storage system 130. In this way, it is possible to reduce the amount of the memory 112 consumed by the server module 110.

Moreover, since the server module 110 dynamically changes the target block group among the block groups accessed by the application 201 based on the number of block group-based accesses, it is possible to realize cache control on blocks with high cache efficiency.

Second Embodiment

Next, a second embodiment of the present invention will be described.

The second embodiment is different from the first embodiment in that the access management information (access counter) is hierarchized within the server module 110. More specifically, the blocks in the first embodiment are regarded as lower-level blocks and the block groups in the first embodiment are regarded as higher-level blocks, and the server module manages the numbers of accesses to the higher-level blocks and the lower-level blocks.

In the second embodiment, the target block group is referred to as a target higher-level block and the non-target block group is referred to as a non-target higher-level block.

Hereinafter, the difference from the first embodiment will be described. The same configurations or operations as those of the first embodiment are denoted by the same reference numerals.

The configuration of the computer system and the hardware configuration of the computer system according to the second embodiment are the same as those of the first embodiment, and description thereof will not be provided.

Figure 13:
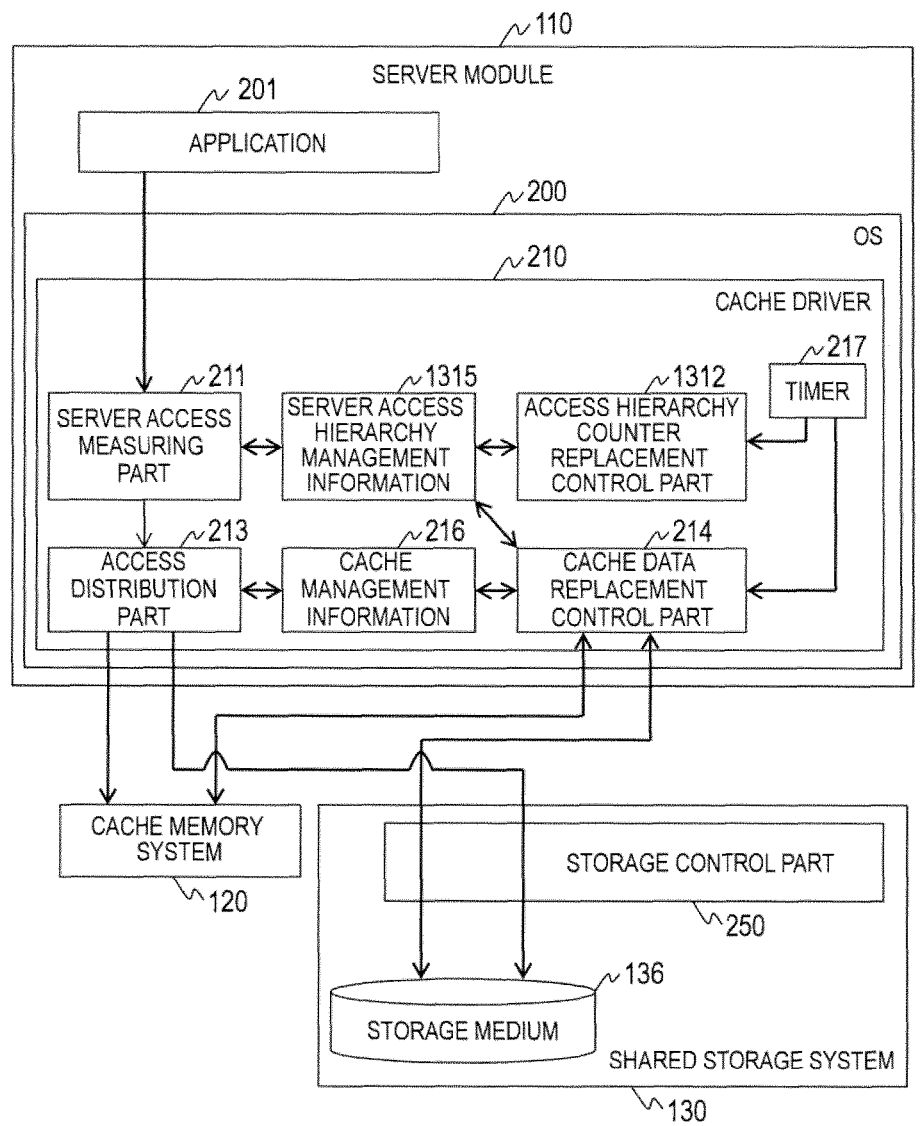
FIG. 13 is a diagram illustrating an example of a software configuration of a computer system according to a second embodiment.

FIG. 13 is a diagram illustrating an example of a software configuration of a computer system according to the second embodiment of the present invention.

In the second embodiment, the configuration of a partial constituent component of the cache driver 210 is different. Specifically, the cache driver 210 of the second embodiment includes an access hierarchy counter replacement control part 1312 instead of the access counter replacement control part 212 and stores a server access hierarchy management information 1313 instead of the server access management information 215. The other constituent components are the same as those of the first embodiment.

Moreover, in the second embodiment, the shared storage system 130 does not need to manage the number of accesses, the storage control part 250 of the second embodiment does not store the storage access measuring part 251 and the storage access management information 252.

Figure 14:
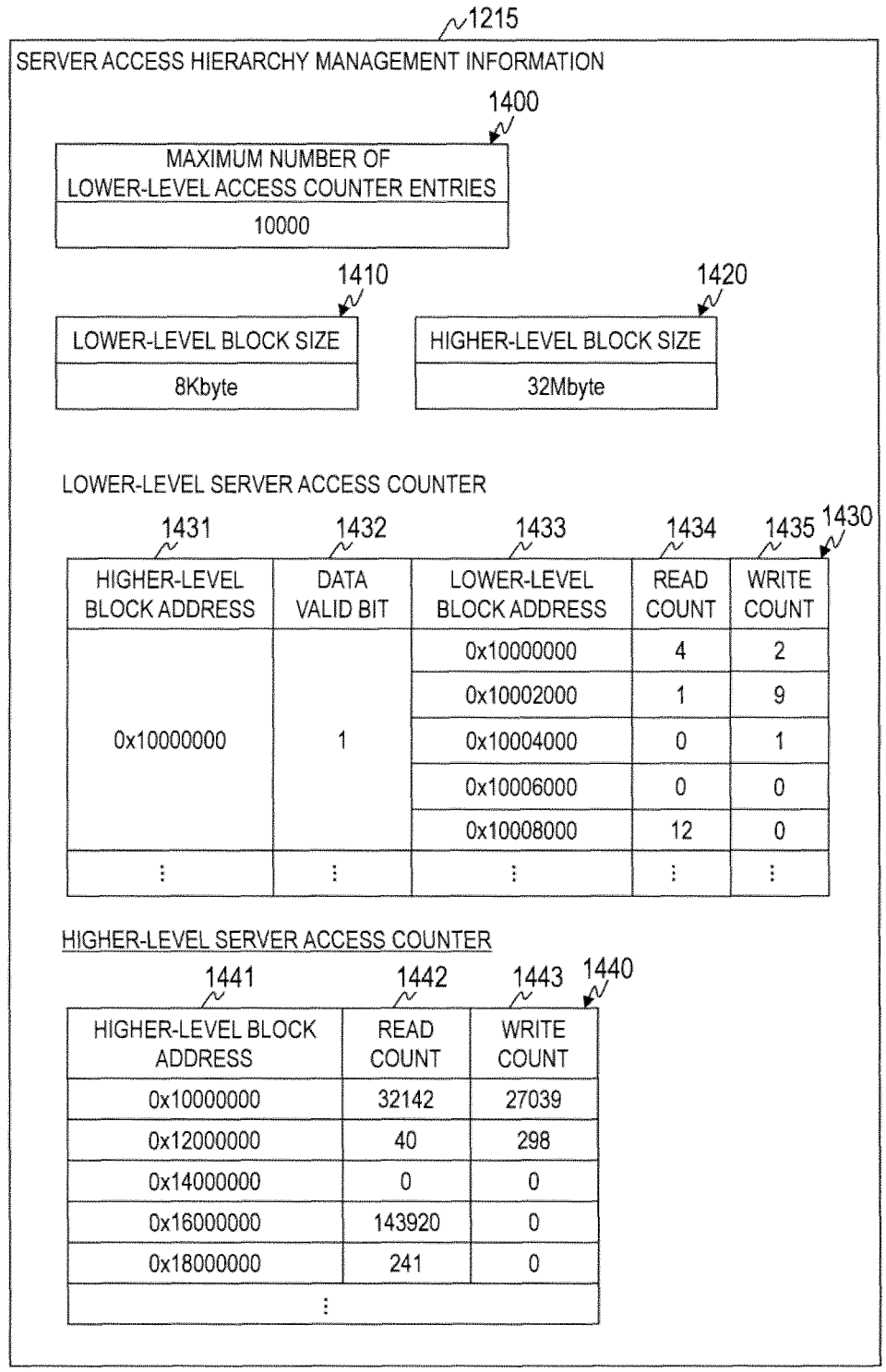
FIG. 14 is a diagram illustrating an example of server access hierarchy management information according to the second embodiment.

FIG. 14 is a diagram illustrating an example of the server access hierarchy management information 1315 according to the second embodiment of the present invention.

The server access hierarchy management information 1315 includes a maximum number of lower-level access counter entries 1400, a lower-level block size 1410, a higher-level block size 1420, a lower-level server access counter 1430, and a higher-level server access counter 1440.

The maximum number of lower-level access counter entries 1400 is the number of entries that can be registered in the lower-level server access counter 1430. That is, the maximum number of lower-level access counter entries 1400 indicates the number of higher-level blocks that the cache driver 210 can mange.

The lower-level block size 1410 is the size of a lower-level block. In the present embodiment, items of data are stored in lower-level block units in the cache memory system 120. The higher-level block size 1420 is the size of a higher-level block.

The lower-level server access counter 1430 is information for managing the number of accesses to each of the lower-level blocks that constitute the target higher-level block and is information corresponding to the server access counter 330 of the first embodiment. The lower-level server access counter 1430 includes a higher-level block address 1431, a data valid bit 1432, a lower-level block address 1433, a read count 1434, and a write count 1435.

The higher-level block address 1431 is the starting address of higher-level blocks.

The data valid, bit 1432 is a bit indicating whether an entry of a higher-level block corresponding to the higher-level block address 1431 is valid or not.

In the present embodiment, in a case where the data valid bit 1432 is "1," it indicates that the entry is valid. In a case where the data valid bit 1432 is "0," it indicates that the entry is not valid.

The lower-level block address 1433 is the starting address of lower-level blocks that constitute a higher-level block corresponding to the higher-level block address 1431.

The read count 1434 is the number of read operations on a lower-level block corresponding to a lower-level block address 1433. The write count 1435 is the number of write operations on a lower-level block corresponding to a lower-level block address.

The higher-level server access counter 1440 is information for managing the number of accesses to each higher-level block and is information corresponding to the storage access counter 510 of the first embodiment. The higher-level server access counter 1440 includes a higher-level block address 1441, a read count 1442, and a write count 1443.

The higher-level block address 1441 is the starting address of higher-level blocks. The read count 1442 is the number of read operations on a higher-level block. The write count 1443 is the number of write operations on a higher-level block. The read count 1442 and the write count 1443 indicate the sums of the numbers of read operations and the numbers of write operations on lower-level blocks that constitute the higher-level block, respectively.

Hereinafter, operations executed by the cache driver 210 according to the second embodiment will be described.

The operation of step S102 of the access count measuring operation of the second embodiment is different from that of the access count measuring operation of the first embodiment. Specifically, the server access measuring part 211 updates the lower-level server access counter 1430 by the same operation as step S102 of the first embodiment. Moreover, the server access measuring part 211 updates the higher-level server access counter 1440 based on the same operation as the access count measuring operation executed by the storage control part 250 of the first embodiment.

The access distribution operation of the second embodiment is the same as the operation of the first embodiment illustrated in FIG. 8, and description thereof will not be provided.

In the second embodiment, the access counter that manages the number of accesses within the server module 110 is hierarchized. That is, in the higher-level server access counter 1440, the numbers of accesses to all storage areas of the shared storage system 130 are managed in respective higher-level block units. On the other hand, in the lower-level server access counter 1430, the number of accesses to a partial higher-level block of the shared storage system 130 is managed in respective block units.

Due to this, the server module 110 can reduce the consumed capacity of the memory 112 as compared to a case where the numbers of accesses to all storage areas of the shared storage system 130 are managed in respective block units.

In order to realize the access count management method described above, the server module 110 needs to appropriately determine a storage area (target higher-level block) in which the number of accesses is to be managed in respective lower-level block units among all storage areas (all higher-level blocks) of the shared storage system 130 and to dynamically change the target higher-level block according to an access state.

Hereinafter, the access counter replacement operation according to the second embodiment will be described with reference to FIG. 15.

Figure 15:
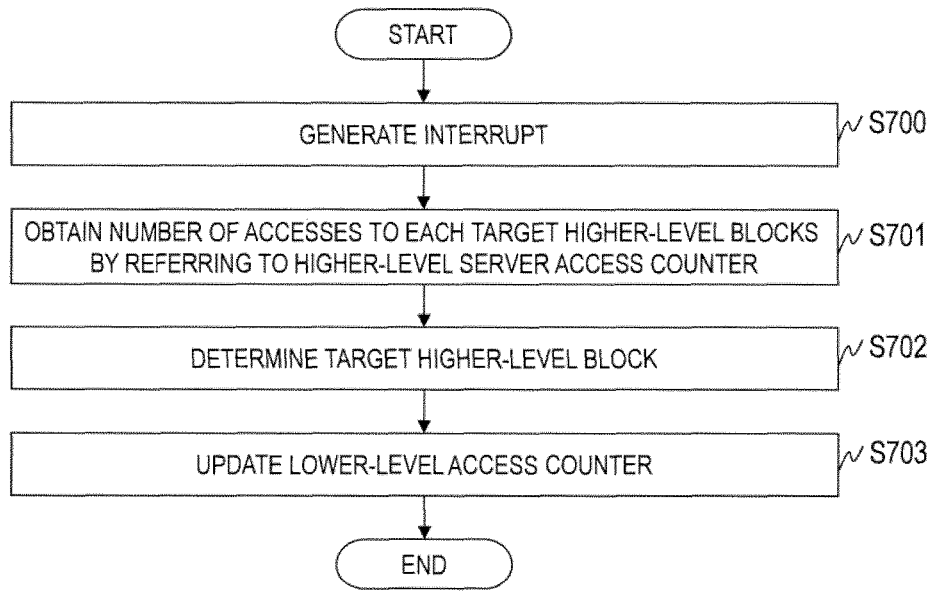
FIG. 15 is a flowchart illustrating the access counter replacement operation executed by an access hierarchy counter replacement control part according to the second embodiment.

FIG. 15 is a flowchart illustrating the access counter replacement operation executed by the access hierarchy counter replacement control part 1312 according to the second embodiment of the present invention.

The timer/counter 600 causes the access hierarchy counter replacement control part 1312 to generate an interrupt to notify the start of operations according to the access counter replacement operation interrupt timing 610.

In a case of receiving the interrupt from the timer/counter 600 (step S700), the access hierarchy counter replacement control part 1312 starts the operation.

The access hierarchy counter replacement control part 1312 obtains the number of accesses to each higher-level block by referring to the higher-level server access counter 1440 (step S701).

The access hierarchy counter replacement control part 1312 determines a higher-level block (that is, a target higher-level block) managed by the lower-level server access counter 1430 based on the numbers of accesses to the respective higher-level blocks, obtained from the higher-level server access counter 1440 (step S702).

For example, the access hierarchy counter replacement control part 1312 determines the target higher-level block within the range of the maximum number of lower-level access counter entries 1400 in descending order of the sums of the read counts and the write counts to the higher-level block.

The determination method described above is an example, and the present invention is not limited to this. For example, the target higher-level block may be determined in descending order of the read counts.

The access hierarchy counter replacement control part 1312 replaces the target higher-level block by updating the lower-level server access counter 1430 based on the information on the determined target higher-level block (step S703). After that, the access hierarchy counter replacement control part 1312 ends the operation. Specifically, the following operations are executed.

The access hierarchy counter replacement control part 1312 specifies a higher-level block to be excluded from the target higher-level block (that is, a higher-level block to be removed from the lower-level server access counter 1430). Further, the access hierarchy counter replacement control part 1312 sets "0" to the data valid bit 1432 of the entries of the removed higher-level block. A method of specifying the higher-level block to be removed is the same as that of step S405.

The access hierarchy counter replacement control part 1312 registers entries corresponding to a target higher-level block which is not registered in the lower-level server access counter 1430 among the target higher-level blocks determined in step S702 in the lower-level server access counter 1430.

More specifically, the access hierarchy counter replacement control part 1312 sets the addresses of the target higher-level blocks which are not registered to the higher-level block address 1431 of the entries of which the data valid bit 1432 is "0". Further, the access hierarchy counter replacement control part 1312 segments the higher-level block into lower-level blocks and sets the addresses of the respective lower-level blocks to the lower-level block address 1433 of the entries. Further, the access hierarchy counter replacement control part 1312 sets an initial value to the read count 1434 and the write count 1435 of the entries.

An initial value of "0" may be set to the read count 1434 and the write count 1435, for example, and a value calculated based on Mathematical Formulas (5) and (6) below may be set.

The values of the read count 1442, the higher-level block size 1420, and the lower-level block size 1410 are substituted into the read count, higher-level block size, and lower-level block size of Mathematical Formula (5). Moreover, the values of the write count 1443, the higher-level block size 1420, and the lower-level block size 1410 are substituted into the write count, higher-level block size, and lower-level block size of Mathematical Formula (6).

Mathematical Formula (5)

$$\text{(Initial value of read count)} = \text{(Read count)} \times \frac{\text{(Lower-level block size)}}{\text{(Higher-level block size)}} \quad (5)$$

Mathematical Formula (6)

$$\text{(Initial value of write count)} = \text{(Write count)} \times \frac{\text{(Lower-level block size)}}{\text{(Higher-level block size)}} \quad (6)$$

After that, the access hierarchy counter replacement control part 1312 sets "1" to the data valid bit 1432 of the entries corresponding to the target higher-level block newly registered in the lower-level server access counter 1430.

Hereinabove, the operation of step S703 has been described.

The cache data replacement operation according to the second embodiment is the same as the operation of the first embodiment illustrated in FIG. 11, description thereof will not be provided.

Figure 16:
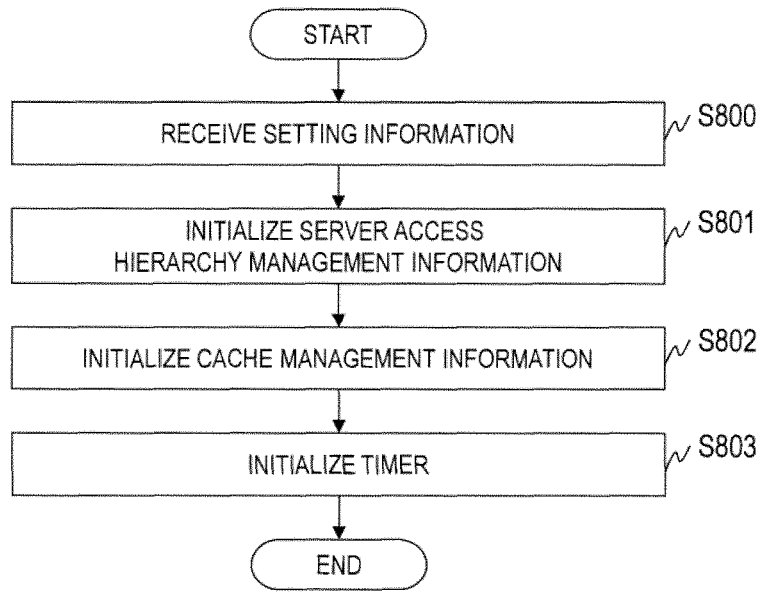
FIG. 16 is a flowchart illustrating an initialization operation executed by the cache driver according to the second embodiment.

FIG. 16 is a flowchart illustrating an initialization operation executed by the cache driver 210 according to the second embodiment of the present invention. Operations other than the operation of initializing the server access hierarchy management information 1315 are the same as those of the first embodiment.

In a case of receiving the input of setting information from an administrator (step S800), the cache driver 210 starts the operation.

The setting information includes the number of entries of the lower-level server access counter 1430, a lower-level block size, a higher-level block size, the cache capacity of the cache memory system 120, an address range of the cache areas of the cache memory system 120, an address range of the storage area of the shared storage system 130, an execution interval of the access counter replacement operation, an execution interval of the cache data replacement operation, and the like.

The administrator may input the setting information directly to the server module 110 and may input the setting information using an administrator server (not illustrated).

The cache driver 210 initializes the server access hierarchy management information 1315 based on the setting information (step S801). Specifically, the following operations are executed.

The cache driver 210 sets the number of entries of the lower-level server access counter 1430 included in the setting information to the maximum number of lower-level access counter entries 1400. The cache driver 210 sets the lower-level block size and the higher-level block size included in the setting information to the lower-level block size 1410 and the higher-level block size 1420, respectively.

The cache driver 210 generates a number of entries corresponding to the maximum number of lower-level access counter entries 1400 in the lower-level server access counter 1430 and sets "0" to the data valid bit 1432 of the generated entries.

The cache driver 210 generates entries of which the address is set for each higher-level block size in the higher-level block address 1441 of the higher-level server access counter 1440 based on the higher-level block size and the address range of the storage areas of the shared storage system 130. Moreover, the cache driver 210 sets "0" to the read count 1442 and the write count 1443 of the generated entries.

Hereinabove, the operation of step S801 has been described.

Subsequently, the cache driver 210 initializes the cache management information 216 (step S802). Specifically, the following operations are executed.

The cache driver 210 sets a value calculated according to Mathematical Formula (7) to the maximum number of cache entries 400. The value of the lower-level block size 1410 is substituted into the lower-level block size of Mathematical Formula (7). Moreover, the cache capacity of the cache memory system 120 included in the setting information is substituted into the cache capacity of the cache memory system of Mathematical Formula (7).

Mathematical Formula (7)

$$\text{(Maximum number of cache entries)} = \frac{\text{(Cache capacity of cache memory system)}}{\text{(Lower-level block size)}} \quad (7)$$

The cache driver 210 generates entries of which the address is set for each lower-level block size in the cache memory address 411 of the cache correspondence table 410 based on the lower-level block size and the address range of the storage areas of the cache memory system 120. Moreover, the cache driver 210 sets "0" to the cache valid bit 413 of the generated entries.

Hereinabove, the operation of step S802 has been described.

The cache driver 210 initializes the timer 217 (step S803) and ends the operation.

Specifically, the cache driver 210 sets the execution interval of the access counter replacement operation and the execution interval of the cache data replacement operation included in the setting information to the access counter replacement operation interrupt timing 610 and the cache data replacement operation interrupt timing 620, respectively.

In the second embodiment, the cache driver 210 manages the number of accesses in respective higher-level block units with respect to all storage areas of the shared storage system 130 and manages the number of accesses in respective lower-level block units with respect to a partial higher-level block only. Thus, similarly to the first embodiment, it is possible to reduce the amount of the memory 112 consumed by the server module 110. Moreover, the server module 110 can realize cache control on blocks with high cache efficiency.

Third Embodiment

Next, a third embodiment of the present invention will be described.

In the third embodiment, the server module 110 has access management information (access counter) for managing the number of accesses in respective block units of a partial storage area of the shared storage system 130.

The cache driver 210 of the server module 110 determines a block group in which the number of accesses is to be managed in respective block units using the access management information in a time sharing manner. Moreover, the cache driver 210 of the server module 110 manages the number of accesses to each of the blocks that constitute the determined block group.

In this way, it is possible to reduce the storage capacity of the main memory on the server side required for storing the number of accesses.

Hereinafter, the difference from the first embodiment will be described. The same configurations or operations as those of the first embodiment are denoted by the same reference numerals.

The configuration of the computer system and the hardware configuration of the computer system according to the third embodiment are the same as those of the first embodiment, and description thereof will not be provided.

Figure 17:
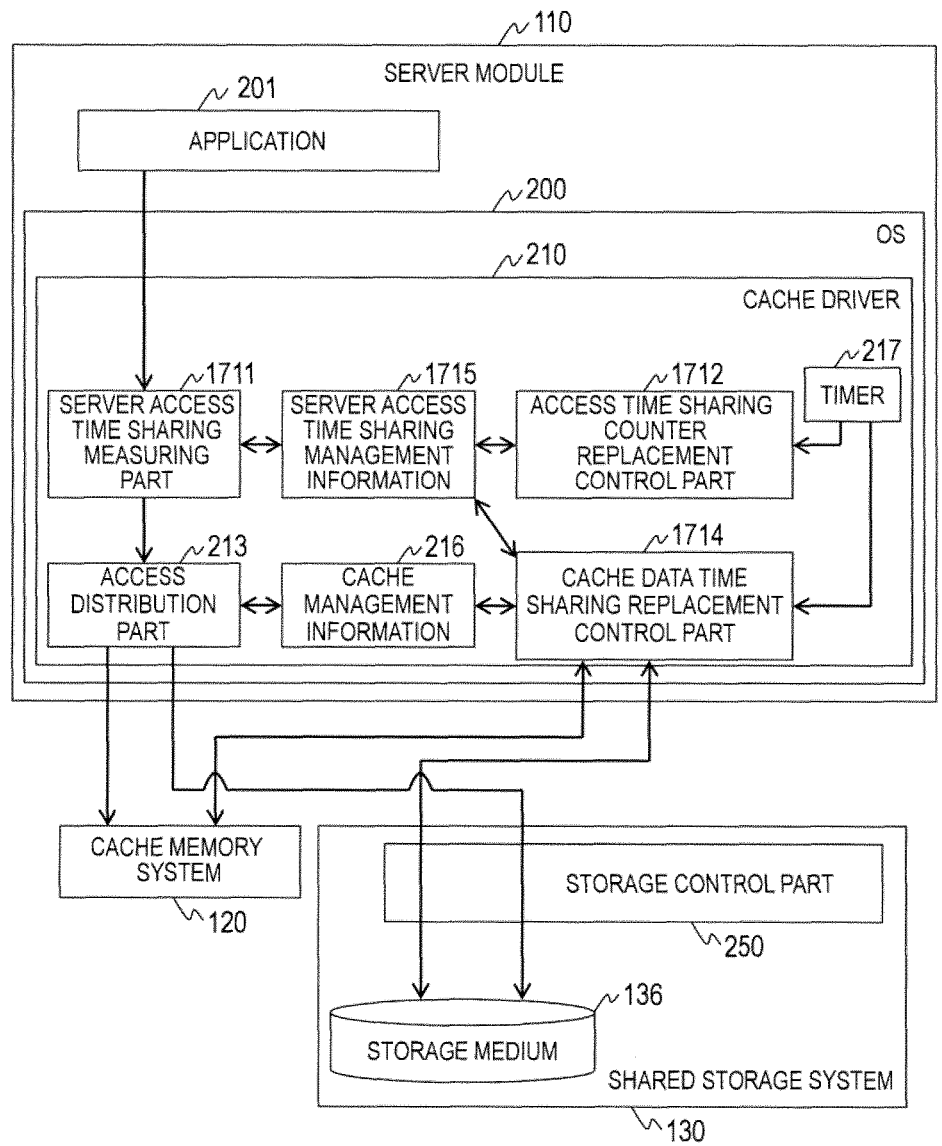
FIG. 17 is a diagram illustrating an example of a software configuration of a computer system according to a third embodiment.

FIG. 17 is a diagram illustrating an example of a software configuration of a computer system according to the third embodiment of the present invention.

In the third embodiment, the configuration of a partial constituent component of the cache driver 210 is different. Specifically, the cache driver 210 of the third embodiment includes a server access time sharing measuring part 1711, an access time sharing counter replacement control part 1712, and a cache data time sharing replacement control part 1714 instead of the server access measuring part 211, the access counter replacement control part 212, and the cache data replacement control part 214. Moreover, the cache driver 210 of the third embodiment stores server access time sharing management information 1715 instead of the server access management information 215. The other constituent components are the same as those of the first embodiment.

Moreover, in the third embodiment, the shared storage system 130 does not need to manage the number of accesses, the storage control part 250 of the third embodiment does not store the storage access measuring part 251 and the storage access management information 252.

Figure 18:
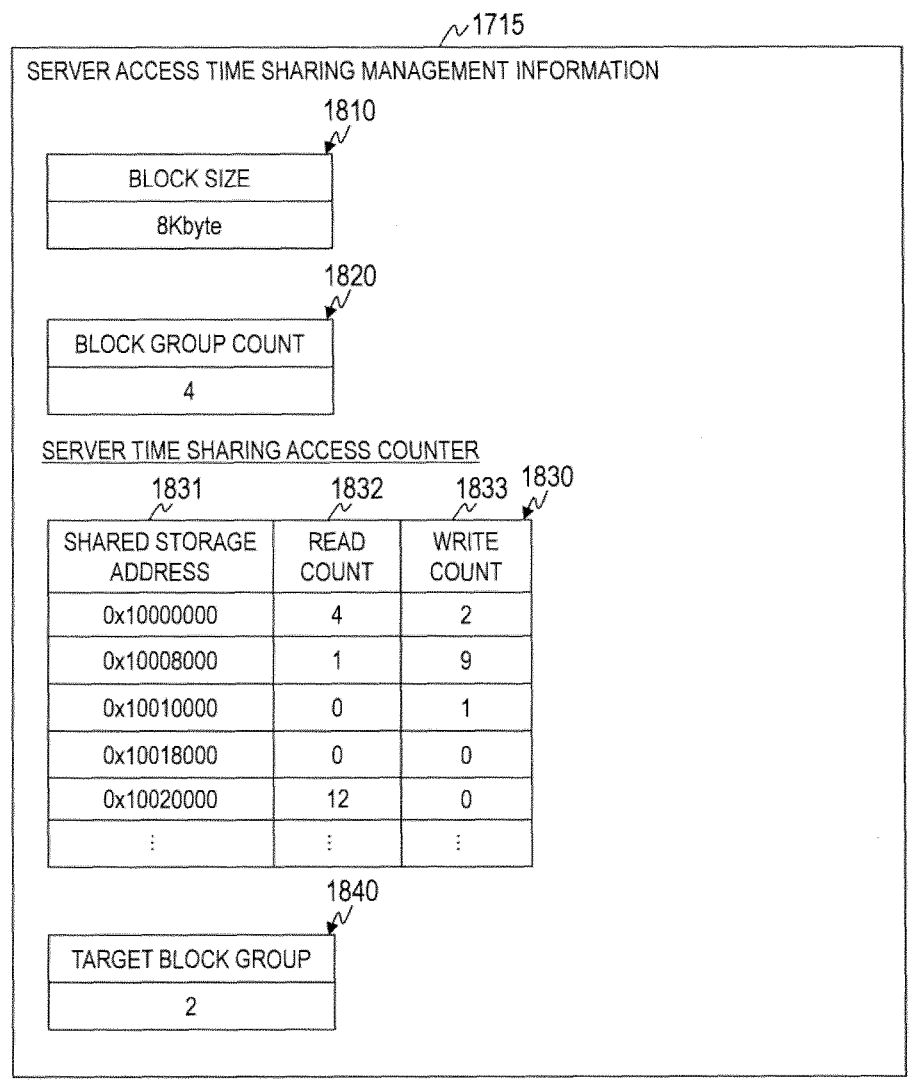
FIG. 18 is a diagram illustrating an example of server access time sharing management information according to the third embodiment.

FIG. 18 is a diagram illustrating an example of the server access time sharing management information 1715 according to the third embodiment of the present invention.

The server access time sharing management information 1715 includes a block size 1810, a block group count 1820, a server time sharing access counter 1830, and a target block group 1840.

The block size 1810 is the size of a block. The block group count 1820 is the number of block groups. The block group count 1820 corresponds to the number of time segments.

In the third embodiment, all storage areas of the cache memory system 120 are divided according to the block group count 1820. In the example illustrated in FIG. 18, all storage areas of the shared storage system 130 are segmented into four block groups, and the number of accesses of each block group is managed every predetermined time interval.

In the present embodiment, it is assumed that the remainder calculated by dividing the addresses of all storage areas of the shared storage system 130 by the block size 1810 is classified by the block group count 1820, whereby the block groups are formed. In the example illustrated in FIG. 18, four block groups in which a block group having the remainder "0," a block group having the remainder "1," a block group having the remainder "2," and a block, group having the remainder "3" are present.

In the following description, a block group in which the number of accesses is managed currently is also referred to as a target block group.

In the third embodiment, the storage area of the cache memory system 120 is also divided by the same number as the block group count 1820. For example, the cache area of the cache memory system 120 is divided using Mathematical Formulas (8) and (9) below. That is, each block group is associated with a cache area of the cache memory system 120, ranging from the value of Mathematical Formula (8) to the value of Mathematical Formula (9).

The values of the maximum number of cache entries 400 and the target block group 1840 are substituted into the maximum number of cache entries and the target block group of Mathematical Formulas (8) and (9).

Mathematical Formulas (8)

$$(\text{Maximum number of cache entries}) \times (\text{Target block group}) \quad (8)$$

Mathematical Formulas (9)

$$(\text{Maximum number of cache entries}) \times \{(\text{Target block group})+1\}-1 \quad (9)$$

The server time sharing access counter 1830 is information for managing a block group in which the number of accesses is managed currently (that is, the number of accesses to each of the blocks that constitute the target block group). The server time sharing access counter 1830 includes a shared storage address 1831, a read count 1832, and a write count 1833.

The shared storage address 1831 is the starting address of block groups.

In the present embodiment, as described above, blocks are classified based on the remainder obtained by dividing the addresses of all storage areas of the shared storage system 130 by the block size 1810. Thus, a plurality of blocks of which the addresses are successive belongs to different block groups. In the example illustrated in FIG. 18, a block next to a block corresponding to an address having the remainder "0" belongs to a block group having the remainder "1".

Thus, in the present embodiment, a block group managed in the server time sharing access counter 1830 is changed every predetermined time interval.

Thus, one entry for each address range calculated using Mathematical Formula (10) is registered in the server time sharing access counter 1830. The values of the block size 1810 and the block group count 1820 are substituted into the block size and block group count of Mathematical Formula (10).

Mathematical Formula (10)

$$(\text{Block size}) \times (\text{Block group count}) \quad (10)$$

The read count 1832 is the number of read operations on a block corresponding to the shared storage address 1831. The write count 1833 is the number of write operations on a block corresponding to the shared storage address 1831.

The target block group 1840 is identification number for identifying a target block group.

In the present embodiment, the target block group is changed every predetermined time interval.

For example, in a case where all storage areas of the shared storage system 130 are segmented into two block groups A and B, the cache driver 210 manages the number of accesses in respective block units using the block group A as a target block group in a certain period. After a predetermined time interval has elapsed, the cache driver 210 changes the target block group to the block group B and manages the number of accesses in respective block units of the block group B.

Moreover, storage area of the cache memory system 120 ranging from "0" to "9999" are associated with the block group A, and storage areas of the cache memory system 120 ranging from "10000" to "19999" are associated with the block group B.

Hereinafter, operations executed by the cache driver 210 according to the third embodiment will be described.

Figure 19:
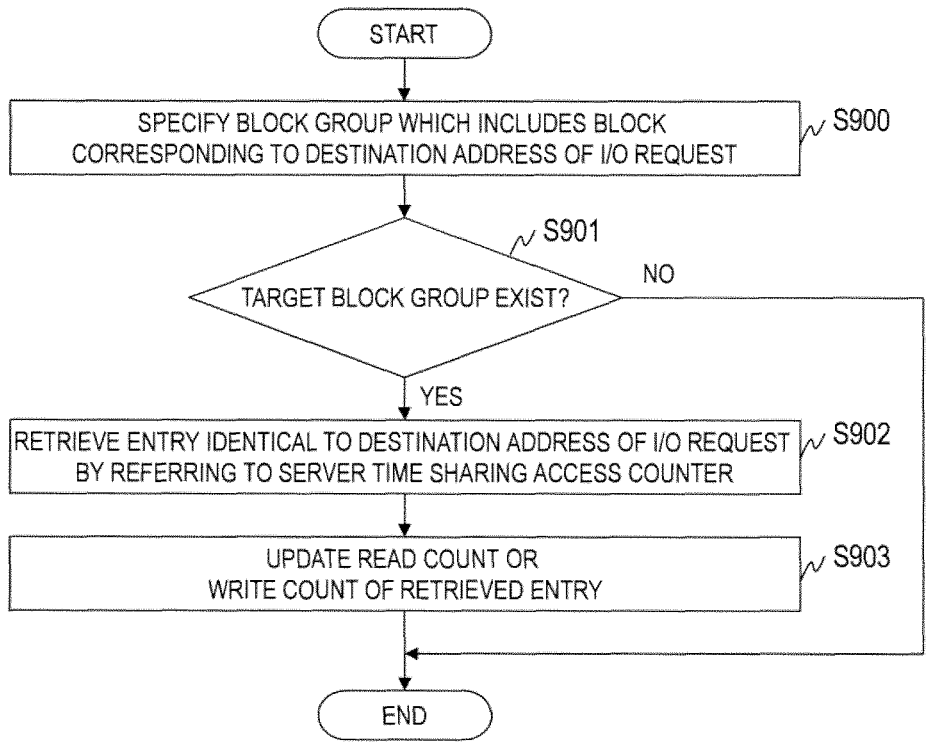
FIG. 19 is a flowchart illustrating the access count measuring operation executed by a server access time sharing measuring part according to the third embodiment.

FIG. 19 is a flowchart illustrating the access count measuring operation executed by the server access time sharing measuring part 1711 according to the third embodiment of the present invention.

In a case where an I/O request is issued from the application 201, first, the I/O request is input to the server access time sharing measuring part 1711 of the cache driver 210. In this case, the server access time sharing measuring part 1711 starts the access count measuring operation.

The server access time sharing measuring part 1711 specifies a block group which includes a block corresponding to the destination address of the I/O request (step S900).

In the present embodiment, the server access time sharing measuring part 1711 specifies a block group which includes block corresponding to the destination address of the I/O request based on Mathematical Formula (11) below. The values of the block size 1810 and the block group count 1820 are substituted into the block size and the block group count of Mathematical Formula (11).

$$\frac{\text{(Destination address of I/O request)}}{\text{(Block size)}} \bmod \text{(Block group count)} \qquad (11)$$

Mathematical Formula (11)

The server access time sharing measuring part 1711 determines whether the specified block group is a target block group (step S901).

Specifically, the server access time sharing measuring part 1711 determines whether the value of Mathematical Formula (11) is identical to a time-multiplexing timing 1814. In a case where the value of Mathematical Formula (11) is identical to a time-multiplexing timing 1814, it is determined that the specified block group is identical to a management target block group.

In a case where it is determined that the specified block group is not the target block group, the server access time sharing measuring part 1711 ends the operation. This is because a block corresponding to the destination address of the I/O request is currently not a management target.

In a case where it is determined that the specified block group is the target block group, the server access time sharing measuring part 1711 retrieves entries identical to the destination address of the I/O request by referring to the server time sharing access counter 1830 (step S902).

Specifically, the server access time sharing measuring part 1711 retrieves entries of which the shared storage address 1831 is identical to the destination address of the I/O request.

The server access time sharing measuring part 1711 adds "1" to the value of the read count 1834 or the write count 1835 of the entries based on the type of the I/O request (step S903) and ends the operation. The operation of step S903 is the same as the operation of step S102.

The access distribution operation of the third embodiment is the same as the operation of the first embodiment illustrated in FIG. 8, and description thereof will not be provided.

Figure 20:
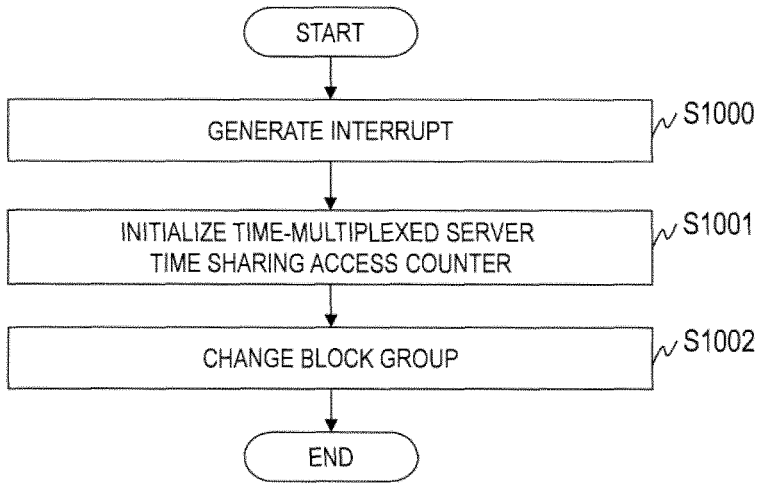
FIG. 20 is a flowchart illustrating the access counter replacement operation executed by an access time sharing counter replacement control part according to the third embodiment.

FIG. 20 is a flowchart illustrating the access counter replacement operation executed by the access time sharing counter replacement control part 1712 according to the third embodiment of the present invention.

In the access counter replacement operation of the third embodiment, the target block group is changed every predetermined time interval.

The timer/counter 600 causes the access time sharing counter replacement control part 1712 to generate an interrupt to notify the start of operations according to the access counter replacement operation interrupt timing 610.

In a case of receiving the interrupt from the timer/counter 600 (step S1000), the access time sharing counter replacement control part 1712 starts the operation.

The access time sharing counter replacement control part 1712 initializes the server time sharing access counter 1830 (step S1001). Specifically, the access time sharing counter replacement control part 1712 sets "0" to the read count 1832 and the write count 1833 of all entries of the server time sharing access counter 1830.

The access time sharing counter replacement control part 1712 changes a block group to which an access counter is allocated by updating the target block group 1840 (step S1002). Specifically, the following operations are executed.

In a case where the value of the target block group 1840 is identical to a value obtained by subtracting "1" from the value of the block group count 1820, the access time sharing counter replacement control part 1712 sets "0" to the target block group 1840. In a case where the value of the target block group 1840 is smaller than a value obtained by subtracting "1" from the value of the block group count 1820, the access time sharing counter replacement control part 1712 adds "1" to the value of the target block group 1840.

With the operation described above, the server time sharing access counter 1830 is cleared every predetermined time interval, and the block group to which the server time sharing access counter 1830 is allocated is changed.

Figure 21:
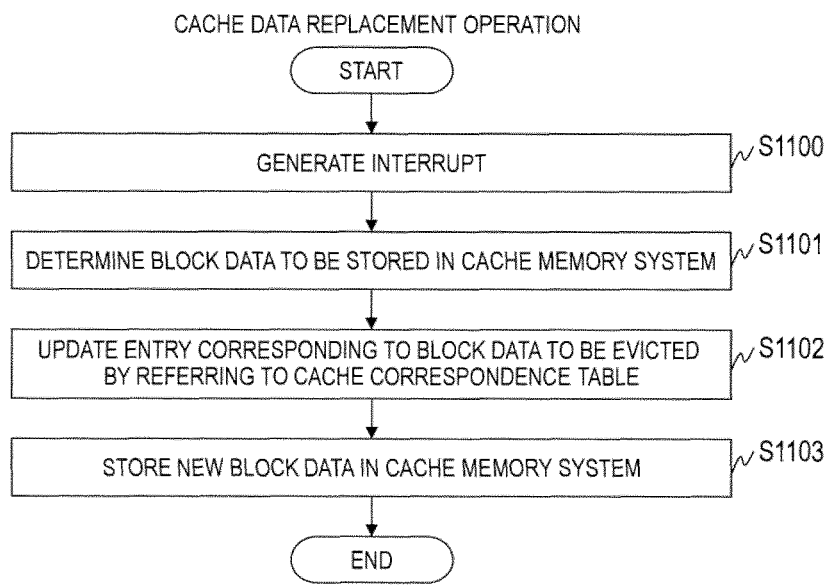
FIG. 21 is a flowchart illustrating the cache data replacement operation executed by a cache data time sharing replacement control part according to the third embodiment.

FIG. 21 is a flowchart illustrating the cache data replacement operation executed by the cache data time sharing replacement control part 1714 according to the third embodiment of the present invention.

In the cache data replacement operation of the third embodiment, the cache data time sharing replacement control part 1714 segments the cache areas of the cache memory system 120 by the number of block groups and performs cache control on the cache areas associated with each block group.

The timer/counter 600 causes the cache data time sharing replacement control part 1714 to generate an interrupt to notify the start of operations according to the cache data replacement operation interrupt timing 620.

In a case of receiving the interrupt from the timer/counter 600, the cache data time sharing replacement control part 1714 starts the operation (step S1100).

The cache data time sharing replacement control part 1714 determines block data to be stored in the cache memory system 120 based on the server time sharing access counter 1830 (step S1101). Specifically, the following operations are executed.

The cache data time sharing replacement control part 1714 obtains the read count 1832 and the write count 1833 of each shared storage address 1831 by referring to the server time sharing access counter 1830. That is, the read count and the write count of each block is obtained.

The cache data time sharing replacement control part 1714 determines data to be arranged in the cache memory system 120 within a range without exceeding the value of Mathematical Formula (12) below based on the read count and the write count of each block. The values of the maximum number of cache entries 400 and the block group count 1820 are substituted into the maximum number of cache entries and the block group count of Mathematical Formula (12).

Mathematical Formula (12)

$$\frac{\text{(Maximum number cache entries)}}{\text{(Block group count)}} \quad (12)$$

The range indicated by Mathematical Formula (12) indicates the number of blocks that can be stored in a cache area associated with the target block group.

Hereinabove, the operation of step S1001 has been described.

Subsequently, the cache data time sharing replacement control part 1714 updates entries corresponding to block data to be evicted from the cache area associated with the target block group based on the operation results of step S1101 (step S1102). The operation of step S1102 is the same as that of step S502.

With the operations above, it is possible to replace only the data of the cache area associated with the target block group.

Hereinabove, the operation of step S1102 has been described.

Subsequently, the cache data time sharing replacement control part 1714 stores new block data in the cache area associated with the target block group (step S1103) and ends the operation. Specifically, the following operations are executed.

The cache data time sharing replacement control part 1714 registers the address of new block data in the shared storage address 412 of the entries of which the cache valid bit 413 is "0," which is the address in the cache area in which the cache memory address 411 is associated with the block group.

The cache data time sharing replacement control part 1714 reads block data from a storage area (block) corresponding to the shared storage address 412 of the entries and stores the read data in the cache area corresponding to the cache memory address 411. Moreover, the cache data time sharing replacement control part 1714 sets "1" to the cache valid bit 413 of the entries.

Hereinabove, the operation of step S1103 has been described.

Figure 22:
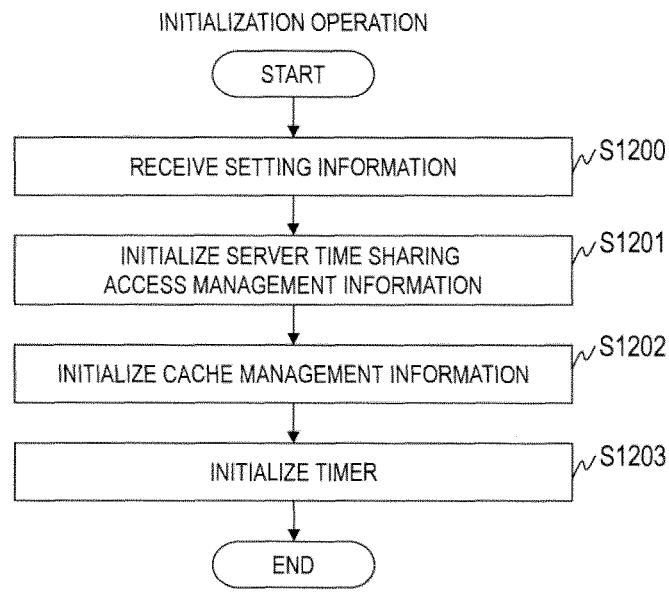
FIG. 22 is a flowchart illustrating the initialization operation executed by the cache driver according to the third embodiment.

FIG. 22 is a flowchart illustrating the initialization operation executed by the cache driver 210 according to the third embodiment of the present invention. Operations other than the operation of initializing the server access time sharing management information 1715 are the same as those of the first embodiment.

In a case of receiving the input of setting information from an administrator (step S1200), the cache driver 210 starts the operation.

The setting information includes a block size, a block group count, a cache capacity of the cache memory system 120, an address range of the cache areas of the cache memory system 120, an execution interval of the access counter replacement operation, an execution interval of the cache data replacement operation, and the like.

The administrator may input the setting information directly to the server module 110 and may input the setting information using an administrator server (not illustrated).

The cache driver 210 initializes the server access time sharing management information 1715 based on the setting information (step S1201). Specifically, the following operations are executed.

The cache driver 210 sets the block size and the block group count included in the setting information to the block size 1810 and the block group count 1820, respectively.

The cache driver 210 generates entries of which the address of each size calculated using Mathematical Formula (10) is set in the shared storage address 1831 in the server time sharing access counter 1830. Moreover, the cache driver 210 sets "0" to the read count 1832 and the write count 1833 of the generated entries.

The cache driver 210 sets "0" to the target block group 1840.

Hereinabove, the operation of step S1201 has been described.

Subsequently, the cache driver 210 initializes the cache management information 216 (step S1202). Specifically, the following operations are executed.

The cache driver 210 sets the value calculated using Mathematical Formula (13) to the maximum number of cache entries 400. The value of the block size 1810 is substituted into the block size of Mathematical Formula (13). Moreover, the cache capacity of the cache memory system 120 included in the setting information is substituted into the cache capacity of the cache memory system of Mathematical Formula (13).

Mathematical Formula (13)

$$\frac{\text{(Cache capacity of cache memory system)}}{\text{(Block size)}} \quad (13)$$

The cache driver 210 generates entries of which the address is set for each block size in the cache memory address 411 of the cache correspondence table 410 based on the block size and the address range of the storage areas of the cache memory system 120. Moreover, the cache driver 210 sets "0" to the cache valid bit 413 of the generated entries.

The cache driver 210 initializes the timer 217 (step S1203) and ends the operation.

Specifically, the cache driver 210 sets the execution interval of the access counter replacement operation and the execution interval of the cache data replacement operation included in the setting information to the access counter replacement operation interrupt timing 610 and the cache data replacement operation interrupt timing 620, respectively.

As described above, according to the third embodiment, the server module 110 segments the storage area of the shared storage system 130 into a plurality of block groups and manages the number of accesses in respective block units with respect to only one block group. In this way, it is possible to reduce the amount of the memory 112 consumed by the server module 110.

Moreover, the server module 110 can realize cache control on blocks that constitute the target block group by periodically changing the target block group.

Further, the server module 110 performs cache control on the cache area associated with the target block group, it is possible to realize cache control on respective block groups with high cache efficiency.

In the third embodiment, the number of accesses is managed in respective block units with respect to only a partial storage area (target block group) similarly to the first embodiment. In this way, it is possible to reduce the amount of the memory 112 consumed by the server module 110. Moreover, the server module 110 can realize cache control on blocks with high cache efficiency.

Fourth Embodiment

Next, a fourth embodiment of the present invention will be described.

In the fourth embodiment, the server module 110 has access management information (access counter) for managing the number of accesses in respective block units of a partial storage area of the shared storage system 130.

The cache driver 210 of the server module 110 determines a block in which the number of accesses is to be managed in respective block units using the access management information based on a cache algorithm.

In the present embodiment, the LRU scheme is used as the cache algorithm. Moreover, a linked list is used to realize the LRU scheme. Since the linked list is a linked list of partial blocks managed in the cache correspondence table 2450, the consumption amount of the memory 112 is sufficiently small.

In this way, it is possible to reduce the storage capacity of the main memory on the server side required for storing the number of accesses.

Hereinafter, the difference from the first embodiment will be described. The same configurations or operations as those of the first embodiment are denoted by the same reference numerals.

The configuration of the computer system and the hardware configuration of the computer system according to the fourth embodiment are the same as those of the first embodiment, and description thereof will not be provided.

Figure 23:
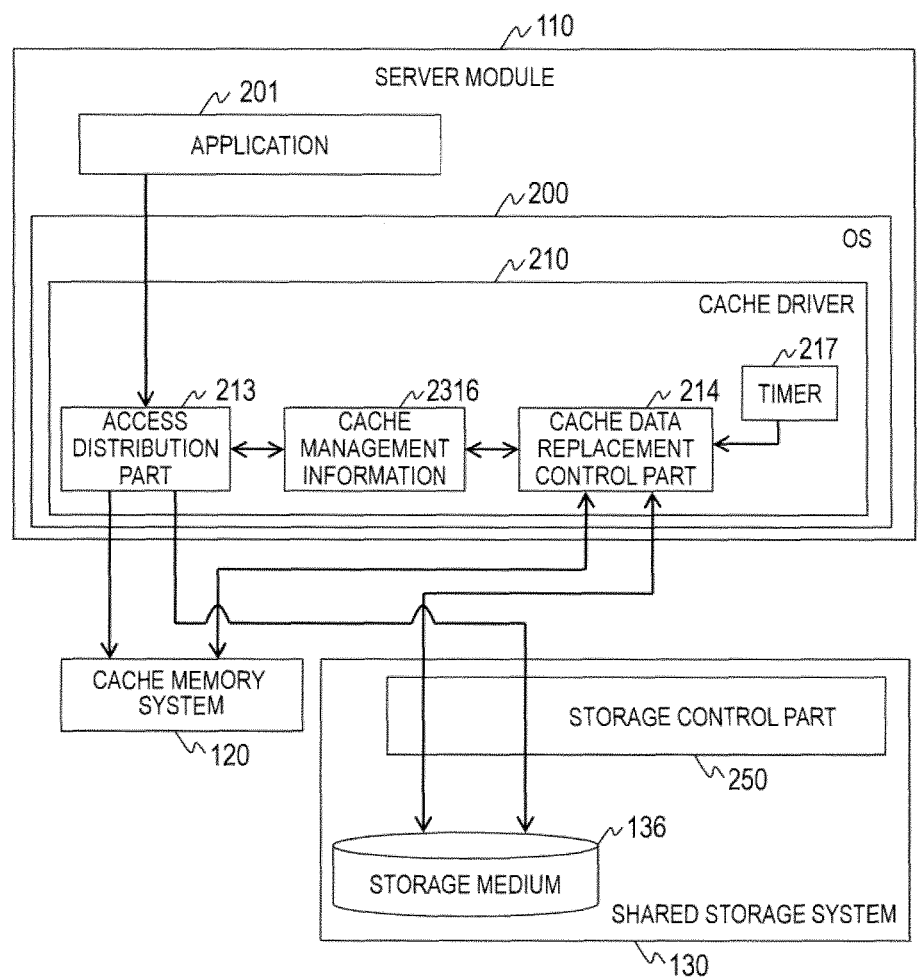
FIG. 23 is a diagram illustrating an example of a software configuration of a computer system according to a fourth embodiment.

FIG. 23 is a diagram illustrating an example of a software configuration of a computer system according to the fourth embodiment of the present invention.

The cache driver 210 of the fourth embodiment includes an access distribution part 213, a cache data replacement control part 214, and a timer 217. Moreover, the cache driver 210 of the fourth embodiment stores cache management information 2316.

The timer 217 of the fourth embodiment does not include the access counter replacement operation interrupt timing 610. This is because, in the LRU scheme, it is possible to replace blocks in a case where it is not possible to add a new block to the access management information (that is, in a case where there is no vacant area in the access counter).

Moreover, since the shared storage system 130 of the fourth embodiment does not need to manage the number of accesses, the storage control part 250 of the fourth embodiment does not include the storage access measuring part 251 and the storage access management information 252.

Figure 24A:
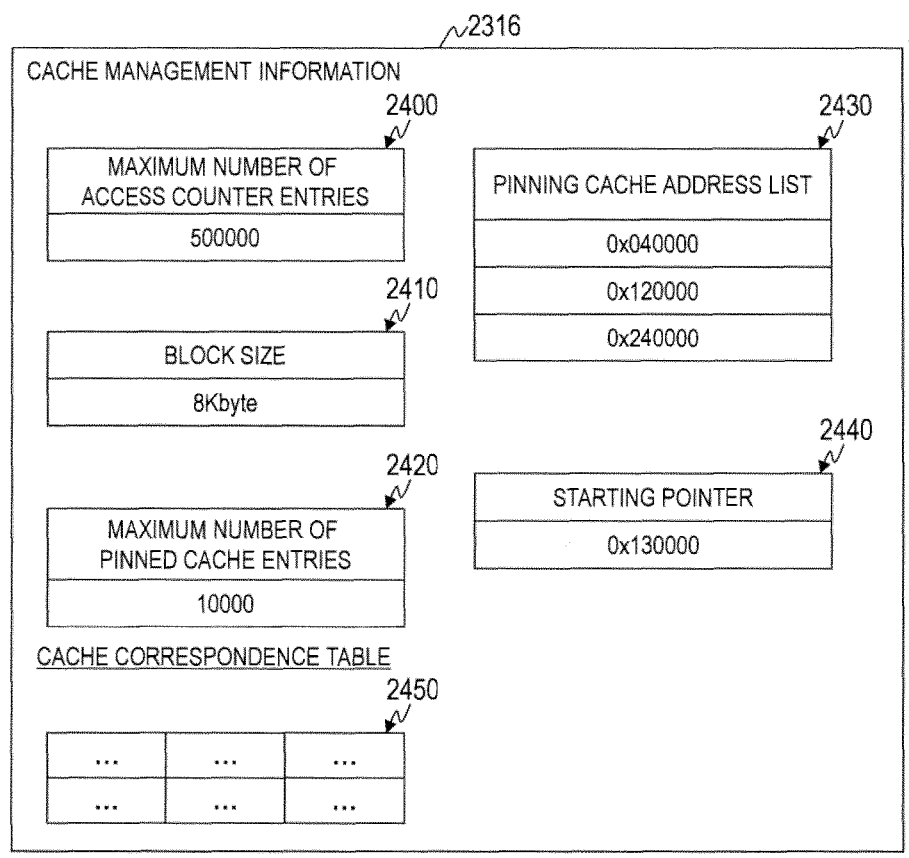
FIGS. 24A and 24B are diagrams illustrating an example of cache management information according to the fourth embodiment.
Figure 24B:

FIGS. 24A and 24B are diagrams illustrating an example of the cache management information 2316 according to the fourth embodiment of the present invention.

The cache management information 2316 includes a maximum number of access counter entries 2400, a block size 2410, a maximum number of pinned cache entries 2420, a pinning cache address list 2430, a starting pointer 2440, and a cache correspondence table 2450.

The maximum number of access counter entries 2400 is the number of entries that can be registered in the cache correspondence table 2450. That is, the maximum number of access counter entries 2400 indicates the number of blocks that the cache driver 210 can manage. The block size 2410 is the size of a block.

The maximum number of pinned cache entries 2420 is the number of entries that can be registered in the cache correspondence table 2450 as block data subjected to cache control based on a pinning method. The pinning cache address list 2430 is an address list of cache areas in which data subjected to cache control based on the pinning method is stored. The starting pointer 2440 is a pointer to the start of a linked list.

The cache correspondence table 2450 is information for managing the number of accesses of each block. The cache correspondence table 2450 includes a cache memory address 2451, a shared storage address 2452, an entry valid bit 2453, a cache valid bit 2454, a read count 2455, a write count 2456, a next entry pointer 2457, and a previous entry pointer 2458. The entries stored in the cache correspondence table 2450 are managed by a linked list.

The cache memory address 2451 is the starting address of cache areas of the cache memory system 120.

The shared storage address 2452 is a storage location (that is, the starting address of blocks) in the shared storage system 130, of the data stored in a cache area corresponding to the cache memory address 2451.

The entry valid bit 2453 is a bit indicating whether an entry of a target block group corresponding to the cache memory address 2451 is valid or not. In the present embodiment, In a case where the entry valid bit 2453 is "1," it indicates that the entry is valid. In a case where the entry valid bit 2453 is "0," it indicates that the entry is not valid.

The cache valid bit 2454 is a bit indicating whether data that can be read into a cache area corresponding to the cache memory address 2451 has been stored or not. In the present embodiment, in a case where the cache valid bit 2454 is "1," it indicates that the data that can be read into a cache area has been stored. In a case where the cache valid bit 2454 is "0," it indicates that the data that can be read into the cache area has not been stored.

The read count 2455 is the number of read operations on a block corresponding to the shared storage address 2452. The write count 2456 is the number of write operations on a block corresponding to the shared storage address 2452.

The next entry pointer 2457 is a pointer indicating the next entry in the linked list. The previous entry pointer 2458 is a pointer indicating a previous entry in the linked list.

In the fourth embodiment, replacement of blocks in which the number of accesses is to be managed is controlled based on a cache control algorithm such as the LRU scheme. Due to this, since the size of the management information for managing the number of accesses can be reduced, it is possible to reduce the amount of the memory 112 consumed by the server module 110.

Specifically, the cache driver 210 stores the cache correspondence table 2450 (access counter) for managing a number of blocks several times larger than the number of blocks that can be stored in the storage capacity of the cache memory system 120 in the cache correspondence table 2450. The cache driver 210 replaces blocks managed in the cache correspondence table 2450 based on the LRU scheme which uses the linked list.

Thus, one of the following three states can be created for one block of the shared storage system 130.

(State 1)

A state where data is stored in the cache area of the cache memory system 120 and the number of accesses to the block data is managed on the server module 110.

(State 2)

A state where the number of accesses to the block data is managed on the server module 110 but the block data is not stored in the cache area of the cache memory system 120.

(State 3)

A state where block data is not stored in the cache area of the cache memory system 120 and the number of accesses to the block data is not managed on the server module 110.

"State 1" corresponds to a state where the entry valid bit 2453 is "1" and the cache valid bit 2454 is "1," and "State 2" corresponds to a state where the entry valid bit 2453 is "1" and the cache valid bit 2454 is "0". "State 3" corresponds to a state where the entry valid bit 2453 is "0" and the cache valid bit 2454 is "0" or a state where an entry corresponding to a block is not present in the cache correspondence table 2450.

Transition between "State 1," "State 2," and "State 3" (that is, replacement of block data of which the number of accesses is managed by the server module 110) is controlled based on the LRU scheme.

In the following description, if an entry in which the number of accesses to a block is managed is present in the cache correspondence table 2450, it is referred to as an access counter hit, and if an entry in which the number of accesses to a block is not present in the cache correspondence table 2450, it is referred to as an access counter miss.

Although the present embodiment controls replacement of block data to which the number of accesses is managed using the LRU scheme, another cache algorithm may be used. Moreover, although the linked list is used as the data structure of the cache correspondence table 2450, a data structure may be changed according to a cache algorithm applied.

Hereinafter, operations executed by the cache driver 210 according to the fourth embodiment will be described.

Figure 25:
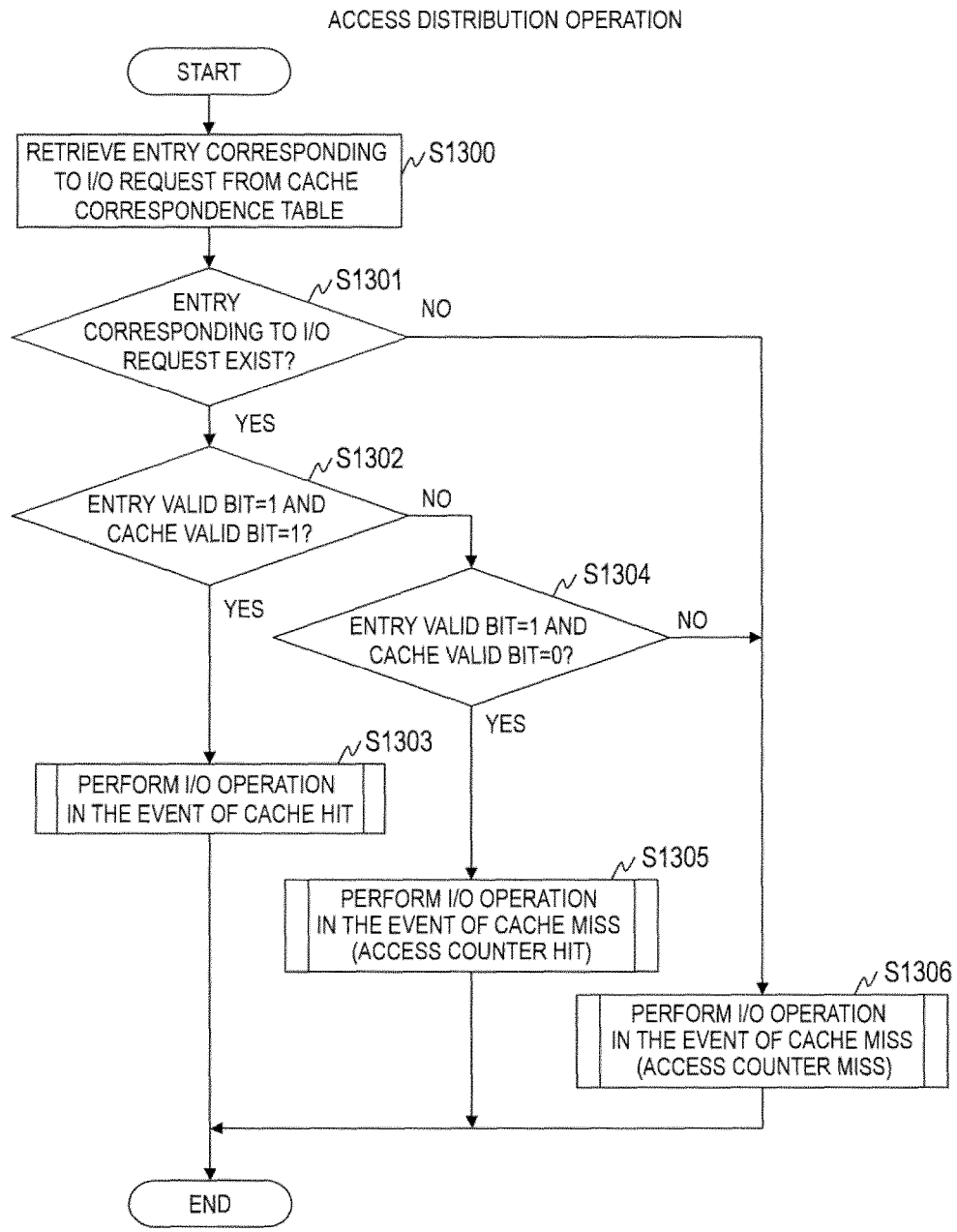
FIG. 25 is a flowchart illustrating an access distribution operation executed by the access distribution part according to the fourth embodiment.

FIG. 25 is a flowchart illustrating an access distribution operation executed by the access distribution part 213 according to the fourth embodiment of the present invention.

In a case were an I/O request is issued from the application 201, first, the I/O request is input to the access distribution part 213 of the cache driver 210. In this case, the access distribution part 213 starts the access distribution operation.

First, the access distribution part 213 retrieves an entry corresponding to the I/O request by referring to the cache correspondence table 2450 of the cache management information 2316 (step S1300).

Specifically, the access distribution part 213 retrieves an entry of which the shared storage address 2452 is identical to the destination address of the I/O request.

The access distribution part 213 determines whether an entry corresponding to the I/O request exists in the cache correspondence table 2450 based on the retrieval results (step S1301).

In a case where it is determined, that an entry identical to the I/O request is not present in the cache correspondence table 2450, the access distribution part 213 executes an I/O operation in the event of a cache miss and an access counter miss (step S1306) and ends the operation. The I/O operation in the event of a cache miss and an access counter miss will be described later with reference to FIG. 28.

In a case where it is determined that an entry corresponding to the I/O request is present in the cache correspondence table 2450, the access distribution part 213 determines whether the entry valid bit 2453 of the entry is "1" and the cache valid bit 2454 thereof is "1" (step S1302). That is, it is determined whether the block is in State 1.

In a case where it is determined that the entry valid bit 2453 of the retrieved entry is "1" and the cache valid bit 2454 thereof is "1," the access distribution part 213 executes an I/O operation in the event of a cache hit (step S1303) and ends the operation. The I/O operation in the event of the cache hit will be described later with reference to FIG. 26.

In a case where it is determined that the entry valid bit 2453 of the entry is "1" and the cache valid bit 2454 thereof is not "1," the access distribution part 213 determines whether the entry valid bit 2453 of the entry is "1" and the cache valid bit 2454 thereof is "0" (step S1304). That is, it is determined whether the block is in "State 2".

In a case where it is determined that the entry valid bit 2453 of the entry is "1" and the cache valid bit 2454 thereof is "0," the access distribution part 213 executes an I/O operation in the event of a cache miss and an access counter hit (step S1305) and ends the operation. The I/O operation in the event of the cache miss and the access counter hit will be described later with reference to FIG. 27.

In a case where it is determined that the entry valid bit 2453 of the entry is "1" and the cache valid bit 2454 thereof is not "0," the access distribution part 213 executes an I/O operation in the event of a cache miss and an access counter miss (step S1306) and ends the operation.

Figure 26:
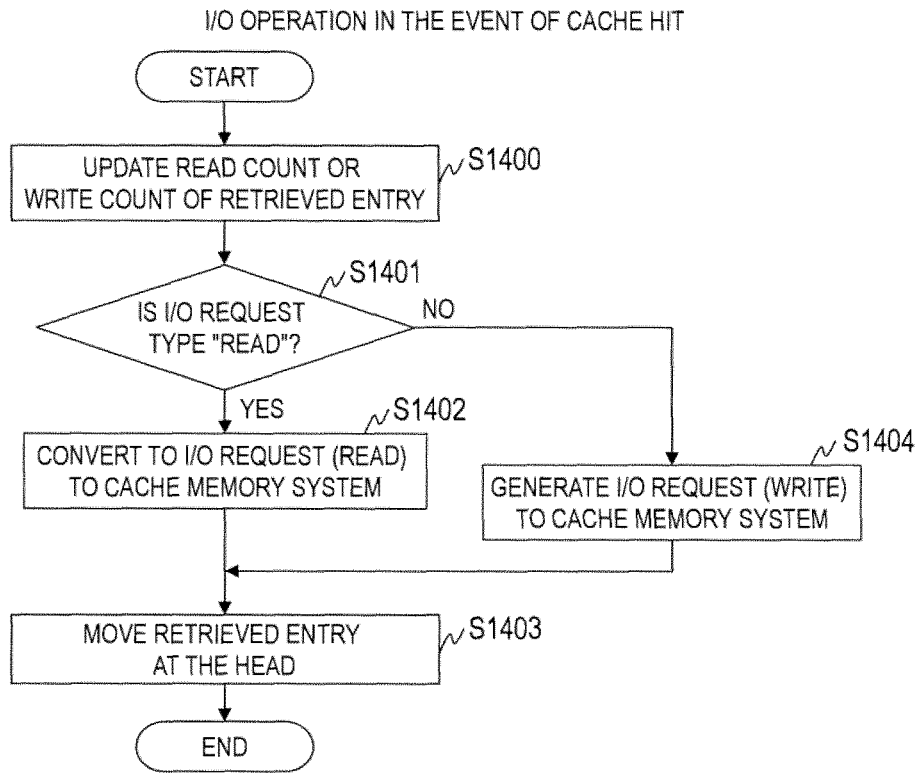
FIG. 26 is a flowchart illustrating an I/O operation in the event of a cache hit, executed by the access distribution part according to the fourth embodiment.

FIG. 26 is a flowchart illustrating the I/O operation in the event of the cache hit, executed by the access distribution part 213 according to the fourth embodiment.

First, the access distribution part 213 adds "1" to the value of the read count 2455 or the write count 2456 of the entry retrieved in step S1300 based on the type of the I/O request (step S1400). The operation of step S1400 is the same as the operation of step S102.

The access distribution part 213 determines whether the type of the I/O request is "READ" (step S1401).

In a case where it is determined that the type of the I/O request is "READ," the access distribution part 213 converts the I/O request to an I/O request (read request) to the cache memory system 120 (step S1402) and proceeds to step S1403. The operation of step S1402 is the same as the operation of step S203.

In a case where it is determined that the type of the I/O request is "WRITE," the access distribution part 213 generates an I/O request (write request) to the cache memory system 120 (step S1404) and proceeds to step S1403. The operation of step S1403 is the same as the operation of step S204.

The access distribution part 213 arranges the retrieved entry at the start of the linked list (step S1403) and ends the operation. Specifically, the following operations are executed.

The access distribution part 213 retrieves an entry (second entry) corresponding to the previous entry pointer 2458 of the retrieved entry (first entry). The access distribution part 213 sets a pointer stored in the next entry pointer 2457 of the first entry to the next entry pointer 2457 of the second entry.

The access distribution part 213 retrieves an entry (third entry) corresponding to the starting pointer 2440 and sets a pointer indicating the first entry to the previous entry pointer 2458 of the third entry.

The access distribution part 213 sets a pointer stored in the next entry pointer 2457 of the third entry to the next entry pointer 2457 of the first entry.

The access distribution part 213 sets a pointer stored in the starting pointer 2440 to the previous entry pointer 2458 of the first entry.

The access distribution part 213 sets a pointer indicating the first entry to the starting pointer 2440.

In the present embodiment, in a case where the entries of the cache correspondence table 2450 are updated, the entries are moved to the start of the linked list. Moreover, in a case where an entry is deleted, an entry at the end of the linked list is deleted. With the operations above, it is possible to realize control corresponding to the LRU scheme on the entries of the cache correspondence table 2450.

Figure 27:
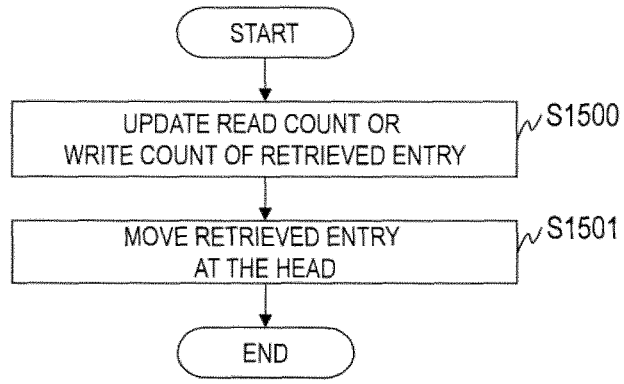
FIG. 27 is a flowchart illustrating an I/O operation in the event of a cache miss and an access counter hit executed by the access distribution part according to the fourth embodiment.

FIG. 27 is a flowchart illustrating an I/O operation in the event of a cache miss and an access counter hit executed by the access distribution part 213 according to the fourth embodiment of the present invention.

The access distribution part 213 adds "1" to the value of the read count 2455 or the write count 2456 of the entry retrieved in step S1300 based on the type of the I/O request (step S1500). The operation of step S1500 is the same as the operation of step S102.

The access distribution part 213 arranges the retrieved entry at the start of the linked list (step S1501) and ends the operation.

Figure 28:
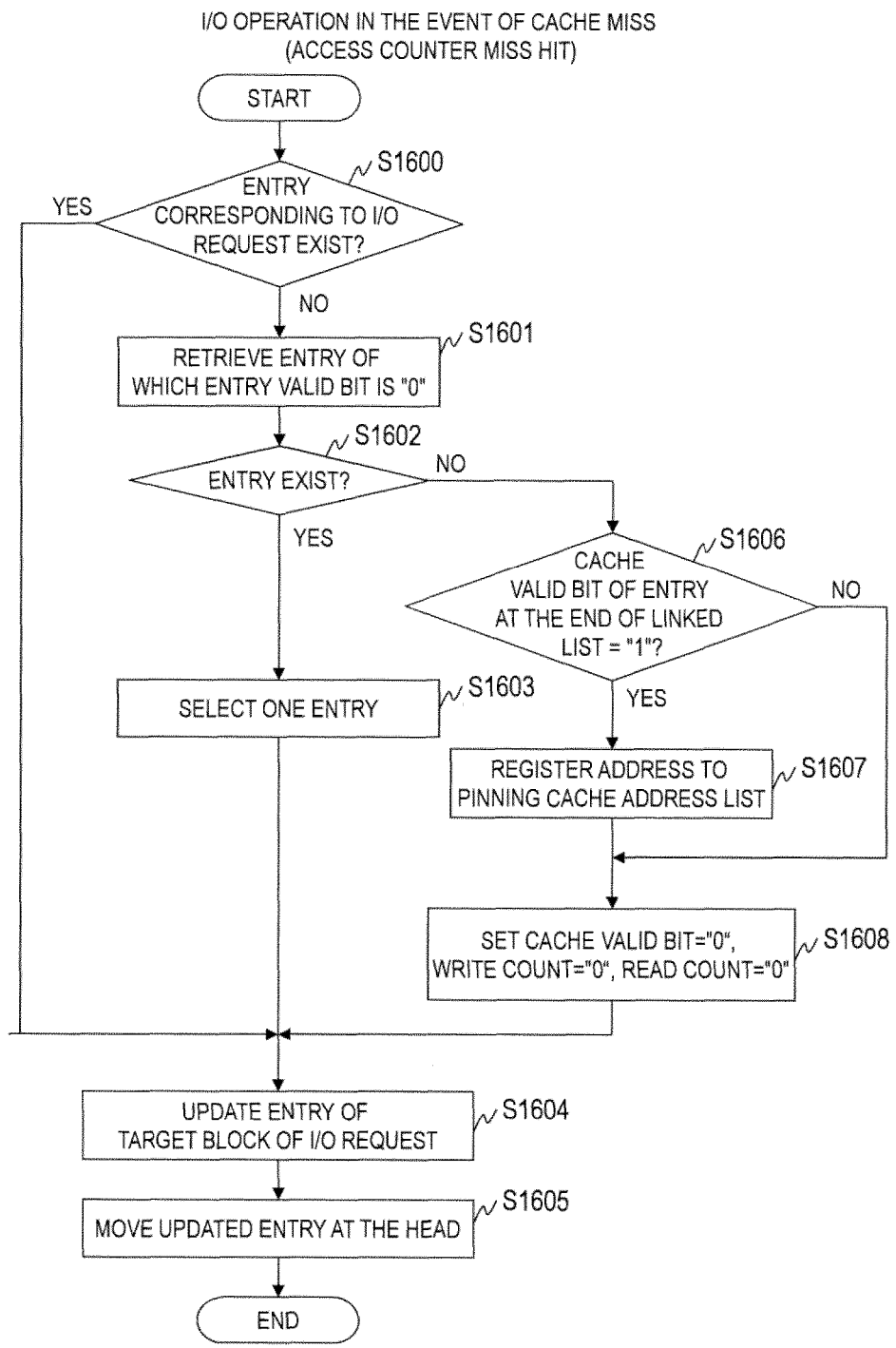
FIG. 28 is a flowchart illustrating an I/O operation in the event of a cache miss and an access counter miss executed by the access distribution part according to the fourth embodiment.

FIG. 28 is a flowchart illustrating the I/O operation in the event of a cache miss and an access counter miss executed by the access distribution part 213 according to the fourth embodiment of the present invention.

The access distribution part 213 determines whether an entry corresponding to the I/O request exists (step S1600). The determination may be performed using the determination results of step S1301.

In a case where it is determined that the entry corresponding to the I/O request exists, the access distribution part 213 proceeds to step S1604.

In a case where it is determined that the entry corresponding to the I/O request does not exist, the access distribution part 213 retrieves an entry of which the entry valid bit 2453 is "0" by referring to the cache correspondence table 2450 (step S1601).

The access distribution part 213 determines whether an entry of which the entry valid bit 2453 is "0" exists in the cache correspondence table 2450 based on the retrieval results (step S1602).

In a case where it is determined that the entry of which the entry valid bit 2453 is "0" exists, the access distribution part 213 select one entry (step S1603), and then, proceeds to step S1604.

In a case where it is determined that an entry of which the entry valid bit 2453 is "0" does not exist, the access distribution part 213 obtains an entry at the end of the linked list of the cache correspondence table 2450 and determines whether the cache valid bit 2454 of the entry is "1" (step S1606).

In a case where it is determined that the cache valid bit 2454 of the entry at the end of the linked list is not "1," the access distribution part 213 proceeds to step S1608.

In a case where it is determined, that the cache valid bit 2454 of the entry at the end of the linked list is "1," the access distribution part 213 registers the address stored in the cache memory address 2451 of the entry in the pinning cache address list 2430 (step S1607).

The access distribution part 213 initializes the entry at the end of the linked list of the cache correspondence table 2450 (step S1608), and then, proceeds to step S1604. Specifically, the access distribution part 213 sets "0" to the entry valid bit 2453, the cache valid bit 2454, the read count 2455, and the write count 2456 of the entry.

The access distribution part 213 updates the entry corresponding to a target block of the I/O request (step S1604). In step S1604, the content updated is different depending on a branch. Specifically, the following operations are executed.

In the case of the branch of step S1600, the access distribution part 213 sets "1" to the entry valid bit 2453 of the entry. Moreover, the access distribution part 213 adds "1" to the value of the read count 2455 or the write count 2456 of the entry based on the type of the I/O request.

In the case of the branch of step S1603, the access distribution part 213 sets the destination address of the I/O request to the shared storage address 2452 of the selected entry and sets "1" to the entry valid bit 2453. Moreover, the access distribution part 213 adds "1" to the value of the read count 2455 or the write count 2456 of the entry based on the type of the I/O request.

In the case of the branch of step S1608, the access distribution part 213 sets the destination address of the I/O request to the shared storage address 2452 of the initialized entry and sets "1" to the entry valid bit 2453. Moreover, the access distribution part 213 adds "1" to the value of the read count 2455 or the write count 2456 of the entry based on the type of the I/O request.

Hereinabove, the operation of step S1604 has been described.

The access distribution part 213 arranges the entry updated in step S1604 at the start of the linked list (step S1605) and ends the operation.

In the case of the branch of step S1600 or S1608, the operation of step S1605 is the same as the operation of step S1403.

In the case of the branch of step S1603, the following operations are executed in step S1605.

First, the access distribution part 213 retrieves an entry (fourth entry) corresponding to the starting pointer 2440 and sets a pointer indicating an updated entry (fifth entry) to the previous entry pointer 2458 of the fourth entry.

The access distribution part 213 sets a pointer stored in the next entry pointer 2457 of the fourth entry to the next entry pointer 2457 of the fifth entry.

The access distribution part 213 sets a pointer stored in the starting pointer 2440 to the previous entry pointer 2458 of the fifth entry.

The access distribution part 213 sets a pointer indicating the fifth entry to the starting pointer 2440.

Figure 29:
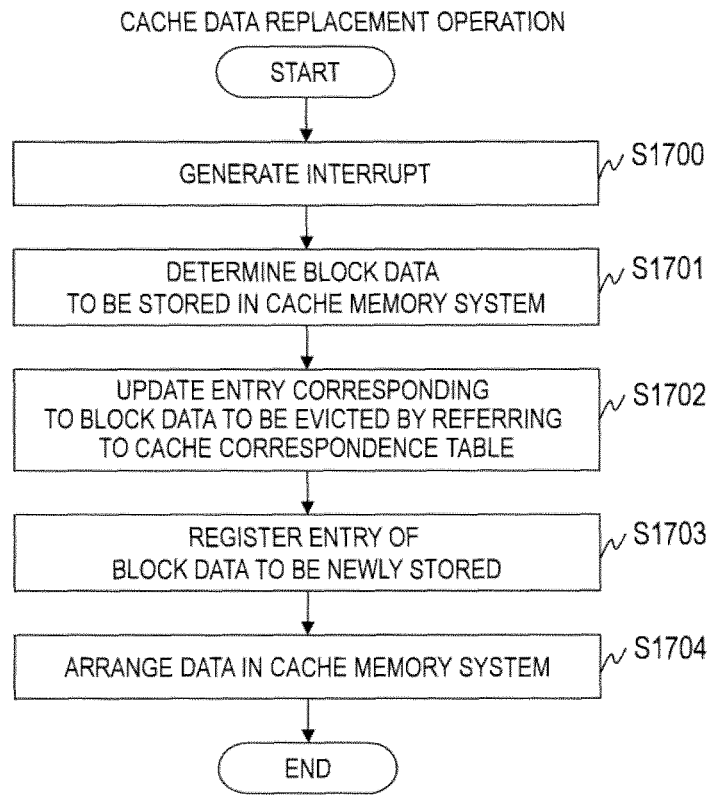
FIG. 29 is a flowchart illustrating the cache data replacement operation executed by the cache data replacement control part according to the fourth embodiment.

FIG. 29 is a flowchart illustrating the cache data replacement operation executed by the cache data replacement control part 214 according to the fourth embodiment of the present invention.

The timer/counter 600 causes the cache data replacement control part 214 to generate an interrupt to notify the start of operations according to the cache data replacement operation interrupt timing 620.

In a case of receiving the interrupt from the timer/counter 600, the cache data replacement control part 214 starts the operation (step S1700).

The cache data replacement control part 214 determines block data to be stored in the cache memory system 120 based on the cache correspondence table 2450 (step S1701). Specifically, the following operations are executed.

The cache data replacement control part 214 obtains the read count 2455 and the write count 2456 of each shared storage address 2452 by referring to the cache correspondence table 2450. That is, the read counts and the write counts of respective blocks are obtained.

The cache data replacement control part 214 determines block data to be stored in the cache memory system 120 within the range of the maximum number of pinned cache entries 2420 based on the read count and the write count of each block.

Hereinabove, the operation of step S1701 has been described.

Subsequently, the cache data replacement control part 214 updates the entry corresponding to the block data to be evicted from the cache area based on the operation results of step S1701 by referring to the cache correspondence table 2450 (step S1702).

A method of determining block data to be evicted is the same as the method used in step S502. In step S1702, the updated content of the entry is different. Specifically, the cache data replacement control part 214 sets "0" to the cache valid bit 2454 of the entry of which the cache memory address 2451 is identical to the address of the cache area in which the determined block data is to be stored by referring to the cache correspondence table 2450. In this case, the block data transitions from "State 1" to "State 2". Further, the cache data replacement control part 214 registers the cache memory address 2451 of the updated entry in the pinning cache address list 2430.

Subsequently, the cache data replacement control part 214 registers the entry of the block data to be newly stored in the cache memory system 120 in the cache correspondence table 2450 (step S1703). Specifically, the following operations are executed.

The cache data replacement control part 214 retrieves a vacant entry or an entry of which the entry valid bit 2453 is "0" by referring to the cache correspondence table 2450. The cache data replacement control part 214 sets the address of the block data to be newly stored in the shared storage address 2452 of the retrieved entry and sets "1" to the entry valid bit 2453 of the entry.

The cache data replacement control part 214 obtains one address from the pinning cache address list 2430. The cache data replacement control part 214 sets the obtained address to the cache memory address 2451 of the retrieved entry.

Hereinabove, the operation of step S1703 has been described.

Subsequently, the cache data replacement control part 214 stores the new block data in the cache memory system 120 (step S1704) and ends the operation.

Specifically, the cache data replacement control part 214 reads block data from a storage area (block) corresponding to the shared storage address 2452 of the entry updated in step S1703 and stores the read data in the cache area corresponding to the cache memory address 2451. Moreover, the cache data replacement control part 214 sets "1" to the cache valid bit 2454 of the entry.

Figure 30:
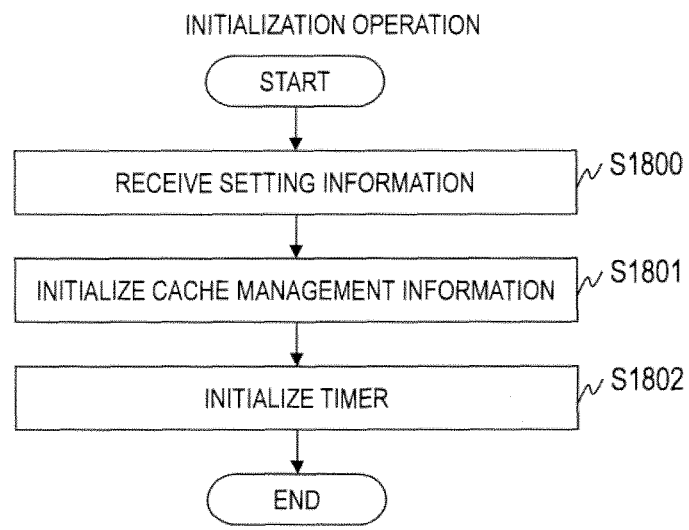
FIG. 30 is a flowchart illustrating the initialization operation executed by the cache driver according to the fourth embodiment.

FIG. 30 is a flowchart illustrating the initialization operation executed by the cache driver 210 according to the fourth embodiment of the present invention.

In a case of receiving the input of setting information from an administrator (step S1800), the cache driver 210 starts an initialization operation.

The setting information includes the number of entries of the access counter, a block size, the number of pinned cache entries, a cache capacity of the cache memory system 120, an address range of the cache areas of the cache memory system 120, an execution interval of the cache data replacement operation, and the like.

The cache driver 210 initializes the cache correspondence table 2450 based on the setting information (step S1801). Specifically, the following operations are executed.

The cache driver 210 sets the number of entries of the access counter and the number of pinned cache entries to the maximum number of access counter entries 2400 and the maximum number of pinned cache entries 2420.

The cache driver 210 sets the block size included in the setting information to the block size 2410. The cache driver 210 sets entries of which the address is set for each block size to the pinning cache address list 2430 based on the block size 2410 and the maximum number of pinned cache entries 2420.

The cache driver 210 generates a number of entries corresponding to the number of cache areas in the cache correspondence table 2450 based on the block size and the address range of the storage areas of the cache memory system 120. Moreover, the cache driver 210 sets "0" to the entry valid bit 2453 and the cache valid bit 2454 of the generated entries.

The cache driver 210 initializes the timer 217 (step S1802) and ends the operation.

Specifically, the cache driver 210 sets the execution interval of the cache data replacement operation included in the setting information to the cache data replacement operation interrupt timing 620.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing (operating) modules, and processing (operation) means, for all or a part of them, may be implemented by hardware: for example, by designing an integrated circuit.

The above-described configurations and functions may be implemented by software, which means that a processor interprets and executes programs providing the functions.

The information, of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer system comprising:
a server on which a predetermined application operates; and
a storage system that stores data used by the application,
the server including a first processor, a first memory, and a cache device on which a server cache that stores data temporarily is set,
the storage system including a controller and a plurality of storage apparatuses,
the controller including a second processor and a second memory, the second processor being configured to:
provide a volume on the plurality of storage apparatuses, the volume including a plurality of second storage areas, the first processor being configured to:
manage the number of accesses to respective storage areas included in a first portion of the plurality of second storage areas of the volume;
not manage the number of accesses to respective storage areas included in a second portion of the plurality of second storage areas of the volume; and
control arrangement of data in the server cache based on the number of accesses to the respective storage areas included in the first portion of the plurality of second storage areas of the volume.

2. The computer system according to claim 1,
wherein the first processor stores first access management information for managing the number of accesses to a partial storage area of a volume provided by the storage system,
wherein the first access management information stores the number of accesses in respective first storage areas which are units of access to the volume, and
wherein the first processor is configured to:
manage the volume by segmenting the volume into a plurality of second storage areas each made up of a plurality of the first storage areas;
manage the number of accesses in the respective first storage areas that constitute the second storage area with respect to a predetermined number of the second storage areas only using the first access management information; and
replace the storage area to which the number of accesses is to be managed based on a predetermined replacement algorithm by replacing the second storage area in which the number of accesses is to be managed in the respective first storage areas based on the predetermined replacement algorithm.

3. The computer system according to claim 2,
wherein the computer system stores second access management information for managing the number of accesses in the respective second storage areas, and
wherein the first processor is configured to:
determine an addition target second storage area in which the number of accesses is to be managed in the respective first storage areas based on the number of accesses to each of the plurality of the second storage areas;
specify a removal target second storage area in which management of the number of accesses in the respective first storage areas is to be disabled based on the determination results;
delete information on the number of accesses to the first storage areas that constitute the removal target second storage area from the first access management information; and
add information on the number of accesses to the first storage areas that constitute the addition target second storage area to the first access management information.

4. The computer system according to claim 3,
wherein the storage control unit stores the second access management information,
wherein the first processor is configured to:
determine, in a case of receiving an I/O request from the application, whether the number of accesses to the first storage area corresponding to an access destination of the I/O request is managed by referring to the first access management information; and
update the number of accesses to the first storage area in the first access management information, in a case where it is determined that the number of accesses to the first storage area corresponding to the access destination of the I/O request is managed,
wherein the storage control unit is configured to:
specify, in a case of receiving an I/O request from the application, the second storage area including a storage area corresponding to an access destination of the I/O request; and
update the number of accesses to the specified second storage area in the second access management information, and
wherein the first processor is configured to:
obtain the number of accesses to the second storage area made up of the first storage areas to which the number of accesses is managed from the first access management information;
obtain the number of accesses to the second storage area made up of the first storage areas to which the number of accesses is not managed from the storage control unit; and
determine the addition target second storage area and the removal target second storage area based on the obtained number of accesses to the second storage area.

5. The computer system according to claim 3,
wherein the first processor stores the second access management information, and
wherein the first processor is configured to:
determine, in a case of receiving an I/O request from the application, whether the number of accesses to the first storage area corresponding to an access destination of the I/O request is managed by referring to the first access management information;
update the number of accesses to the first storage area in the first access management information and the number of accesses to the second storage area including the first storage area in the second access management information, in a case where it is determined that the number of accesses to the first storage area corresponding to the access destination of the I/O request is managed;
update the number of accesses to the second storage area including the first storage area in the second access management information, in a case where it is determined that the number of accesses to the storage area corresponding to the access destination of the I/O request is not managed;
obtain the number of accesses to the second storage area from the second access management information; and
determine the addition target second storage area and the removal target second storage area based on the obtained number of accesses to the second storage area.

6. The computer system according to claim 2,
wherein the first processor is configured to replace the second storage area in which the number of accesses is to be managed in the respective first storage areas by using the first access management information every predetermined time interval.

7. The computer system according to claim 6,
wherein the first processor is configured to:
specify, in a case of receiving an I/O request from the application, the second storage area including the first storage area corresponding to an access destination of the I/O request;

determine whether the number of accesses to the first storage areas constituting the specified second storage area is managed; and update the number of accesses to the first storage areas in the first access management information, in a case where it is determined that the number of accesses to the first storage areas constituting the specified second storage area is managed.

8. The computer system according to claim 1,
wherein the first processor stores first access management information for managing the number of accesses to a partial storage area of a volume provided by the storage system,
wherein the first access management information stores the number of accesses in respective first storage areas which are units of access to the volume, and
wherein the first processor is configured to:
determine the first storage area to which the number of accesses is to be managed based on a cache algorithm; and
manage the number of accesses to the determined first storage area using the first access management information.

9. A cache management method in a computer system:
the computer system including a server on which a predetermined application operates; and a storage system that stores data used by the application, wherein
the server including a first processor, a first memory, a cache device on which a server cache that stores data temporarily is set,
the storage system including a controller and a plurality of storage apparatuses,
the controller including a second processor and a second memory, and
the cache management method including:
a step of providing, by the second processor, a volume on the plurality of storage apparatuses, the volume including a plurality of second storage areas;
a step of managing, by the first processor, the number of accesses to respective storage areas included in a first portion of the plurality of second storage areas of the volume and not managing the number of accesses to respective storage areas included in a second portion of the plurality of second storage areas of the volume;
a step of controlling, by the first processor, arrangement of data in the server cache based on the number of accesses to the respective storage areas included in the first portion of the plurality of second storage areas of the volume.

10. The cache management method according to claim 9,
wherein the first processor stores first access management information for managing the number of accesses to a partial storage area of a volume provided by the storage system,
wherein the first access management information stores the number of accesses in respective first storage areas which are units of access to the volume,
wherein the first processor is configured to:
manage the volume by segmenting the volume into a plurality of second storage areas each made up of a plurality of the first storage areas;
manage the number of accesses in the respective first storage areas that constitute the second storage area with respect to a predetermined number of second storage areas only by using the first access management information; and wherein the cache management method comprises a first step of replacing, by the first processor, the storage area to which the number of accesses is to be managed based on a predetermined replacement algorithm, and the first step includes a step of replacing the second storage area in which the number of accesses is to be managed in the respective first storage areas based on the predetermined replacement algorithm.

11. The cache management method according to claim 10,
wherein the storage control part stores second access management information for managing the number of accesses in the respective second storage areas, and
wherein the cache management method further includes:
a step of determining, by the first processor, in a case of receiving an I/O request from the application, whether the number of accesses to the first storage area corresponding to an access destination of the I/O request is managed by referring to the first access management information; and
a step of updating, by the first processor, the number of accesses to the first storage area in the first access management information in a case where it is determined that the number of accesses to the first storage area corresponding to the access destination of the I/O request is managed,
a step of specifying, by the storage control unit, in a case of receiving an I/O request from the application, the second storage area including a storage area corresponding to an access destination of the I/O request; and
a step of updating, by the storage control part, the number of accesses to the specified second storage area in the second access management information, and
wherein the cache management method comprises a first step of replacing, by the first processor, the storage area to which the number of accesses is to be managed based on a predetermined replacement algorithm, and the first step includes:
a step of obtaining, by the first processor, the number of accesses to the second storage area made up of the first storage areas to which the number of accesses is managed from the first access management information;
a step of obtaining, by the first processor, the number of accesses to the second storage area made up of the first storage areas to which the number of accesses is not managed from the storage control part; and
a step of determining, by the first processor, the addition target second storage area to which the number of accesses is managed and the removal target second storage area to which the number of accesses is not managed based on the obtained number of accesses to the second storage area.

12. The cache management method according to claim 10,
wherein the first processor stores second access management information for managing the number of accesses in the respective second storage areas,
wherein the cache management method includes:
a step of determining, by the first processor, in a case of receiving an I/O request from the application, whether the number of accesses to the first storage area corresponding to an access destination of the I/O request is managed by referring to the first access management information;
a step of updating, by the first processor, the number of accesses to the first storage area in the first access management information and the number of accesses to the second storage area including the first storage area in the second access management information, in a case where it is determined that the number of accesses to the first storage area corresponding to the access destination of the I/O request is managed;

a step of updating, by the first processor, the number of accesses to the second storage area including the first storage area in the second access management information, in a case where it is determined that the number of accesses to the first storage area corresponding to the access destination of the I/O request is not managed, and wherein the cache management method comprises a first step of replacing, by the first processor, the storage area to which the number of accesses is to be managed based on a predetermined replacement algorithm, and the first step includes:

a step of obtaining, by the first processor, the number of accesses to the second storage area from the second access management information; and a step of determining, by the first processor, the addition target second storage area to which the number of accesses is managed and the removal target second storage area to which the number of accesses is not managed based on the obtained number of accesses to the second storage area.

13. The cache management method according to claim 10, further comprising a first step of replacing, by the first processor, the storage area to which the number of accesses is to be managed based on a predetermined replacement algorithm, wherein the first step includes a step of replacing, by the first processor, the second storage area in which the number of accesses is to be managed in the respective first storage areas using the first access management information every predetermined time interval.

14. The cache management method according to claim 9, further comprising a first step of replacing, by the first processor, the storage area to which the number of accesses is to be managed based on a predetermined replacement algorithm, wherein the first access management information stores the number of accesses in respective first storage areas which are units of access to the volume, and wherein the first step includes a step of determining the first storage area to which the number of accesses is to be managed based on a cache algorithm.

15. A computer on which a predetermined application operates, wherein the computer comprises a first processor, a first memory, and a cache device on which a cache that stores data temporarily is set, wherein a storage system that stores data used by the application is coupled to the computer, the storage system includes a second processor, a second memory and a plurality of storage apparatuses, and the second processor is configured to provide a volume on the plurality of storage apparatuses, the volume including a plurality of second storage areas, wherein the first processor is configured to:

manage the number of accesses to respective storage areas included in a first portion of the plurality of second storage areas of the volume;

not manage the number of accesses to respective storage areas included in a second portion of the plurality of second storage areas of the volume; and control arrangement of data in the cache based on the number of accesses to the respective storage areas included in the first portion of the plurality of second storage areas of the volume.

\* \* \* \* \*